(12) United States Patent
Shih et al.

(10) Patent No.: US 11,238,163 B1
(45) Date of Patent: Feb. 1, 2022

(54) METHOD FOR OBJECTIVELY AND COMPLETELY INDENTIFYING SYSTEM RESIDUAL VULNERABILITIES

(71) Applicant: Raytheon Company, Waltham, MA (US)

(72) Inventors: William Tin Wun Shih, Whittier, CA (US); Douglas E. Lapp, Yorba Linda, CA (US); William Posey, Palos Verdes Estates, CA (US)

(73) Assignee: RAYTHEON COMPANY, Waltham, MA (US)

( * ) Notice: Subject to any disclaimer, the term of this patent is extended or adjusted under 35 U.S.C. 154(b) by 314 days.

(21) Appl. No.: 16/454,820

(22) Filed: Jun. 27, 2019

(51) Int. Cl.
*G06F 21/57* (2013.01)
*G06F 16/28* (2019.01)

(52) U.S. Cl.
CPC .......... *G06F 21/577* (2013.01); *G06F 16/289* (2019.01); *G06F 2221/033* (2013.01); *G06F 2221/034* (2013.01)

(58) Field of Classification Search
CPC ................. G06F 21/577; G06F 16/289; G06F 2221/034; G06F 2221/033
See application file for complete search history.

(56) References Cited

U.S. PATENT DOCUMENTS

| 2007/0143629 | A1* | 6/2007 | Hardjono | H04L 63/0823 713/189 |
| 2007/0294766 | A1* | 12/2007 | Mir | G06Q 10/06 726/23 |
| 2012/0023579 | A1* | 1/2012 | Zaitsev | G06F 21/56 726/23 |
| 2013/0074188 | A1* | 3/2013 | Giakouminakis | H04L 63/1433 726/25 |
| 2018/0018149 | A1* | 1/2018 | Cook | G06F 8/70 |

* cited by examiner

*Primary Examiner* — Meng Li
(74) *Attorney, Agent, or Firm* — Daly, Crowley, Mofford & Durkee, LLP

(57) ABSTRACT

A method for implementing an object based vulnerability model includes identifying each component in an information system and annotating such component in a database; decomposing each component into major functional objects and annotating each object in a database; identifying actions an attacker could take to modify a behavior of the functional objects in the information system and annotating such actions in a database; capturing a trust score and a trustworthiness score for each object and annotating the trust score and the trustworthiness score in the database; assessing each action on the structure, state, and inputs of each functional object to determine if an interaction exists and annotating the interaction existence in the database; and applying preventive and reactive countermeasures accordingly.

8 Claims, 20 Drawing Sheets

| Object | Trust Score | Trustworthyness Score | TRUST Nonoperational Malware Insertion Pre-Delivery Design | TRUST Nonoperational Malware Insertion Pre-Delivery Production | TRUST Nonoperational Malware Insertion Post-Delivery Logistics/Maintenance |
|---|---|---|---|---|---|
| Gateway | M | H | | | |
| Structure | | | | | |
| Code | | | N20,N21,N22 | B02,N23 | B02,N23 |
| Static Data | | | N20,N21,N22 | B02,N23 | B02,N23 |
| State | | | | | |
| Critical Data Structures — Msg Routing & Access Data | | | | | |
| Global Variables — Direct | | | | | |
| Global Variables — Buffer Overflow | | | | | |
| Stack: Frame | | | | | |
| Stack: Variable Space — Direct | | | | | |
| Stack: Variable Space — Buffer Overflow | | | | | |
| Heap — Direct | | | | | |
| Heap — Buffer Overflow | | | | | |
| Inputs | | | | | |
| Messages — Valid | | | | | |
| Messages — Invalid Type | | | | | |
| Messages — Invalid Size | | | | | |
| Messages — Invalid Frequency | | | | | |
| Messages — Invalid Structure | | | | | |
| Control Messages — Invalid Date | | | | | |
| Data Messages — Invalid Date | | | | | |
| Interrupts — Owned | | | | | |
| Interrupts — Unowned | | | | | |
| Exceptions | | | | | |
| Signals | | | | | |
| Functional Behaviors | | | | | |
| Message Transport | | | | | |
| Message Type Verification | | | | | |
| Enforce Message Quota | | | | | |
| Implementation Behaviors | | | | | |
| Execution Sequence | | | | | |
| Execution Timing | | | | | |
| CPU Usage | | | | | |
| Memory Bus Usage | | | | | |

| | ACTIONS | | | | | | | | | |
|---|---|---|---|---|---|---|---|---|---|---|
| External Devices | | | Operational | | | | | | | |
| | | | Internal Devices | | | | | | | |
| | | | Core | | | | | | | |
| | | | In Scope | | | | Out of Scope | | | |
| Read | Write | Assert | Read | Write | Fetch | Assert | Read | Write | Fetch |
| A02,C01, C02 | A02,C01, C03,H01S, H20S | | | C12,H20S | G01S,G10S, G11S,G22S | | C11 | C12,H20S | C11 |
| A02,C01, C02 | A02,C01, C03,H01S, H20S,H23S | | | C12,H20S, H23S | C13 | | C11 | C12,H20S | C11 |
| A02,C01, C02 | A02,C01, C03,H23S, | | | H23S | C13 | | C11 | C12,H23S | C11 |
| A02,C01, C02 | A02,C01, C03 | | | F31 | C13 | | C11 | C12 | C11 |
| A02,C01, C02 | A02,C01, C03,F04 | | | F04 | C13 | | C11 | C12,F04 | C11 |
| A02,C01, C02 | A02,C01, C03 | | | F31 | C13 | | C11 | C12 | C11 |
| A02,C01, C02 | A02,C01, C03 | | | F31 | C13 | | C11 | C12 | C11 |
| | C01,C03 | | | E02S E03S,E04 E01 F31 | | | | C12 | |
| | C01,C03 | | | | | | | C12 | |
| | C01,C03 | | | | | | | C12 | |
| | | | K11 | | | K11 | | | |
| | | | A10,K10 | | | A10,K10 | | | |
| | | | | | | K12 | | | |
| | | | A10 | | | D10S | | | |

Fig. 16 (Continued)

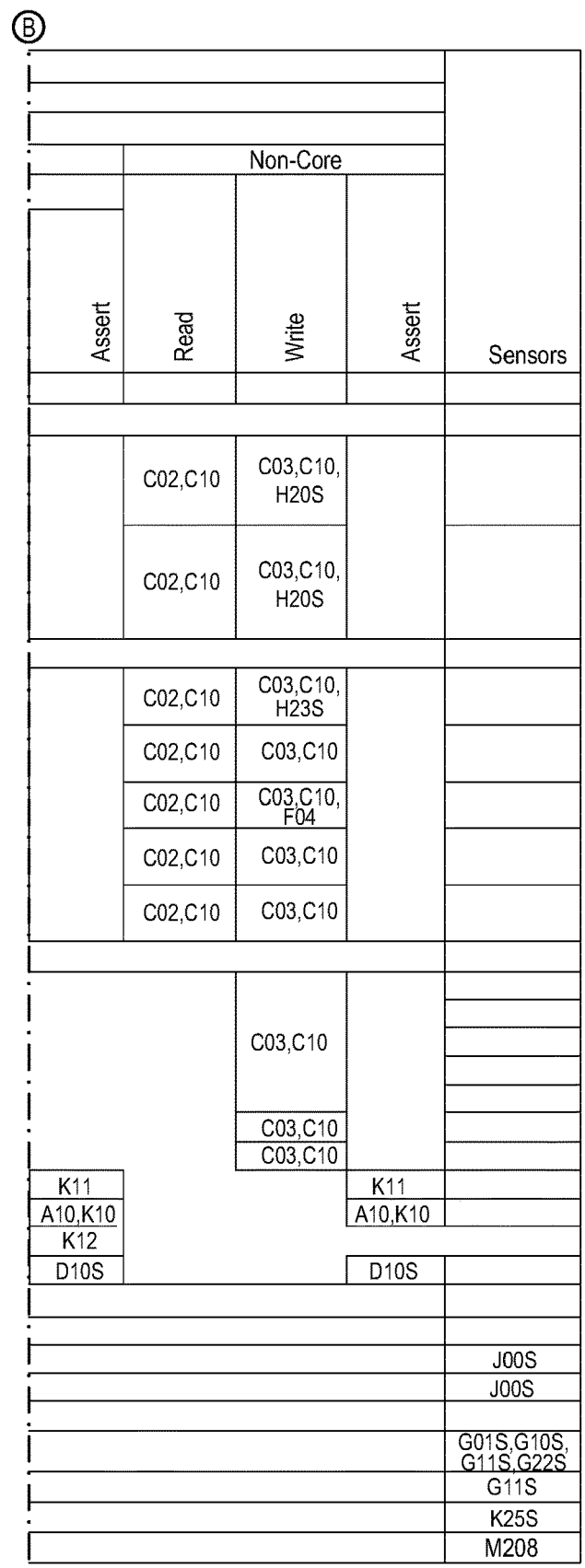
Fig. 16 (Continued Continued)

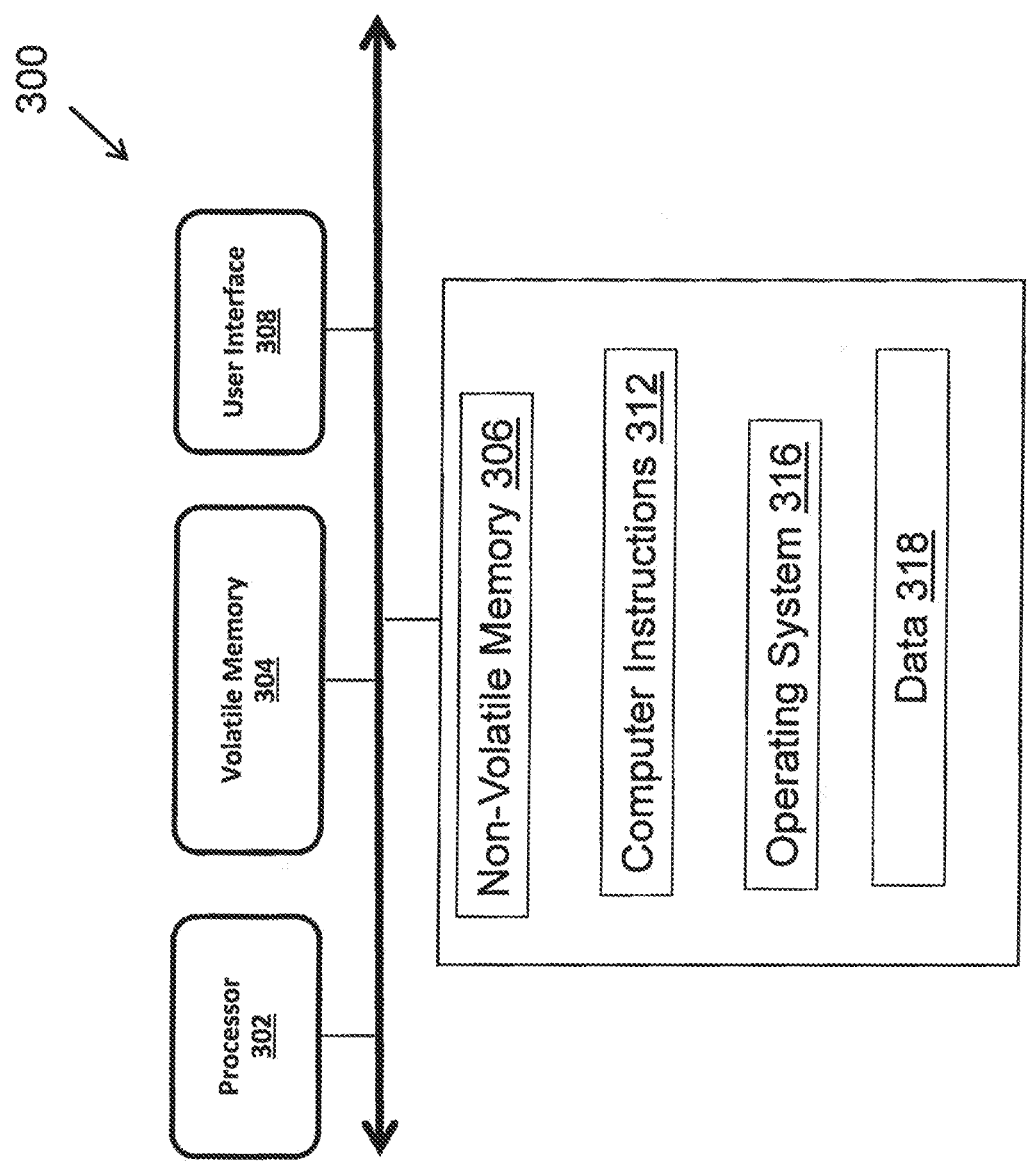

METHOD FOR OBJECTIVELY AND COMPLETELY INDENTIFYING SYSTEM RESIDUAL VULNERABILITIES

FIELD OF THE INVENTION

This disclosure relates generally to system integrity assurance systems and more particularly to a system and techniques to systematically identify a system's residual vulnerabilities.

BACKGROUND

It is desirable to use a System Vulnerability Model (SVM) to systematically and completely model an information system and determine its residual vulnerabilities. The System Vulnerability Model (SVM) must objectively identify system vulnerabilities against a specified cyber threat by iteratively identifying the residual vulnerabilities of the system as countermeasures are applied and identifying information that must be protected to ensure countermeasure effectiveness.

SUMMARY

In accordance with the present disclosure, a method for implementing an object based vulnerability model includes: identifying actions that can alter the behavior of the functional objects in an information system and annotating such action in a database; identifying each component in the information system and annotating such component in a database; decomposing each component into major functional objects and annotating each object in a database; capturing a trust score and a trustworthiness score for each object and annotating the trust score and the trustworthiness score in the database; assessing each action operation on each functional object to determine if an interaction exists with that object and annotating the interaction existence in the database; applying preventive countermeasures to those interactions posing a risk; and applying reactive countermeasures to those interactions posing a risk not protected by preventive countermeasures. With such a method, a process for identifying, characterizing and documenting a system's attack alphabet is provided as well as identifying where countermeasures are needed to mitigate attacks. The process identifies a system's residual vulnerabilities and provides a technique to objectively assess countermeasure effectiveness.

As to be described, the Object Based Vulnerability (OBV) Model provides a system vulnerability model (SVM) role to: identify, characterize, and document a system's attack alphabet; identify where countermeasures are needed to mitigate attacks; identify a system's residual vulnerabilities; and support objectively assessing countermeasure effectiveness.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIG. 16 is a detailed diagram of an object based vulnerability matrix for a sample software object; and FIG. 17 is a block diagram of general purpose computer used to implement the object based vulnerability matrix and database as described.

Like reference symbols in the various drawings indicate like elements.

DETAILED DESCRIPTION

Before departing on a detailed description of the invention, it may be helpful to review some attack centric vulnerability modeling techniques and concepts. Typically, attack centric vulnerability modeling identifies attacks that can potentially exploit a target system by analyzing libraries of currently known attacks. Attack libraries are huge, continually growing databases and applicable attacks can change radically with installed applications. Analysis effort increases as attack libraries and application suites grow. Analysis requires intimate knowledge of the attack library and the system design and the analysis output is highly dependent upon analyst expertise and knowledge.

Typically attacks are individually mitigated by employing virus scanning and firewalls to block attacks during delivery; detecting attacks through their observable system impacts, i.e. the resulting effects; or by eliminating vulnerabilities through system updates commonly referred to as patches. Frequent system updates are required as new attacks are discovered to mitigate such known attacks and despite is shortcomings, analyzing libraries of currently known attacks is the most commonly method used for identifying system vulnerabilities.

Design centric vulnerability modeling analyzes a system design to identify potentially exploitable design features; i.e., the system's vulnerabilities. Such an approach requires intimate familiarity with target system design, but only general understanding of cyber attacks. This approach presumes the system functions as designed unless modified and cyber attacks can only modify systems by modifying the functional objects that make them up. In the present disclosure, the design centric vulnerability model approach is used to identify all possible actions an attacker could take to modify the system functional objects. These actions on objects, called interactions, are the primitive building blocks attackers have access to in order to formulate an attack. The interactions are system, not attack, centric and don't change unless and until the system design changes. The disclosed technique commonly referred to as an object based vulnerability (OBV) model enables deploying countermeasures to mitigate both known and unknown attacks, significantly reducing need for security patch updates.

Figure 1:
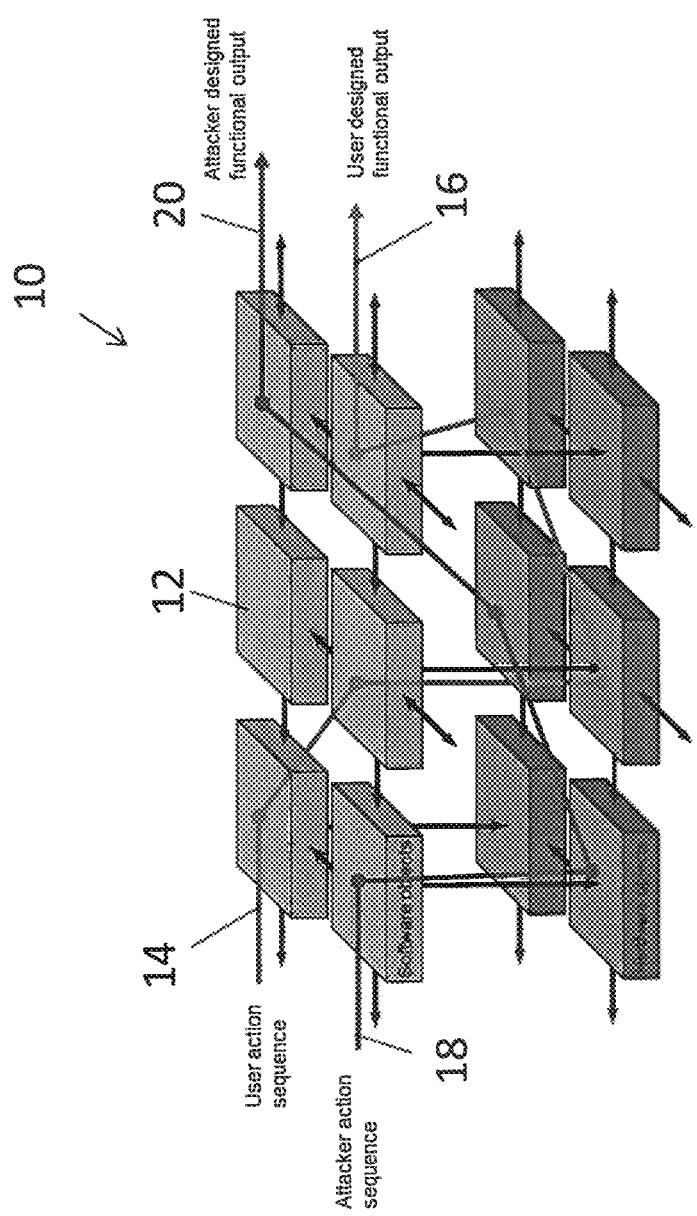
FIG. 1 is a simplified diagram showing interaction among objects in a computer system.

Referring now to FIG. 1, a computer system 10 includes a plurality of objects 12 (here greatly simplified for the sake of clarity). In a typical application, a user action sequence 14 performs a particular set of actions on system objects to provide a user designed functional output 16. In all information systems, there is a set of actions that can be performed on objects to generate functional outputs. The information system allows more interactions than is needed to generate a functional output, interactions that an attacker could exploit. If we can restrict an attacker's access to those nonessential interactions, we can better protect the system. Essential interactions are those needed for proper system operation. Nonessential interactions are all other interactions. For example, attacker action sequence 18 causes a different set of objects to interact to provide an attacker designated functional output 20. Using conventional cyber intrusion protection, attacks are experienced and detected using forensics and detected signatures are added to a library of signatures with patches applied to detect attacks seen to date. The challenge is how to maintain libraries on all systems and subsystems and not lag the threat. Furthermore, there is no zero-day protection so infinite possibilities remain. In the object based vulnerability model (OBV) of the present disclosure, all possible attack trajectories are represented. Hence a finite number of objects exist with a finite number of interactions which can be mitigated with a finite number of countermeasures. Here the security posture leads the threat and zero-day vulnerabilities are mitigated.

Figure 2:
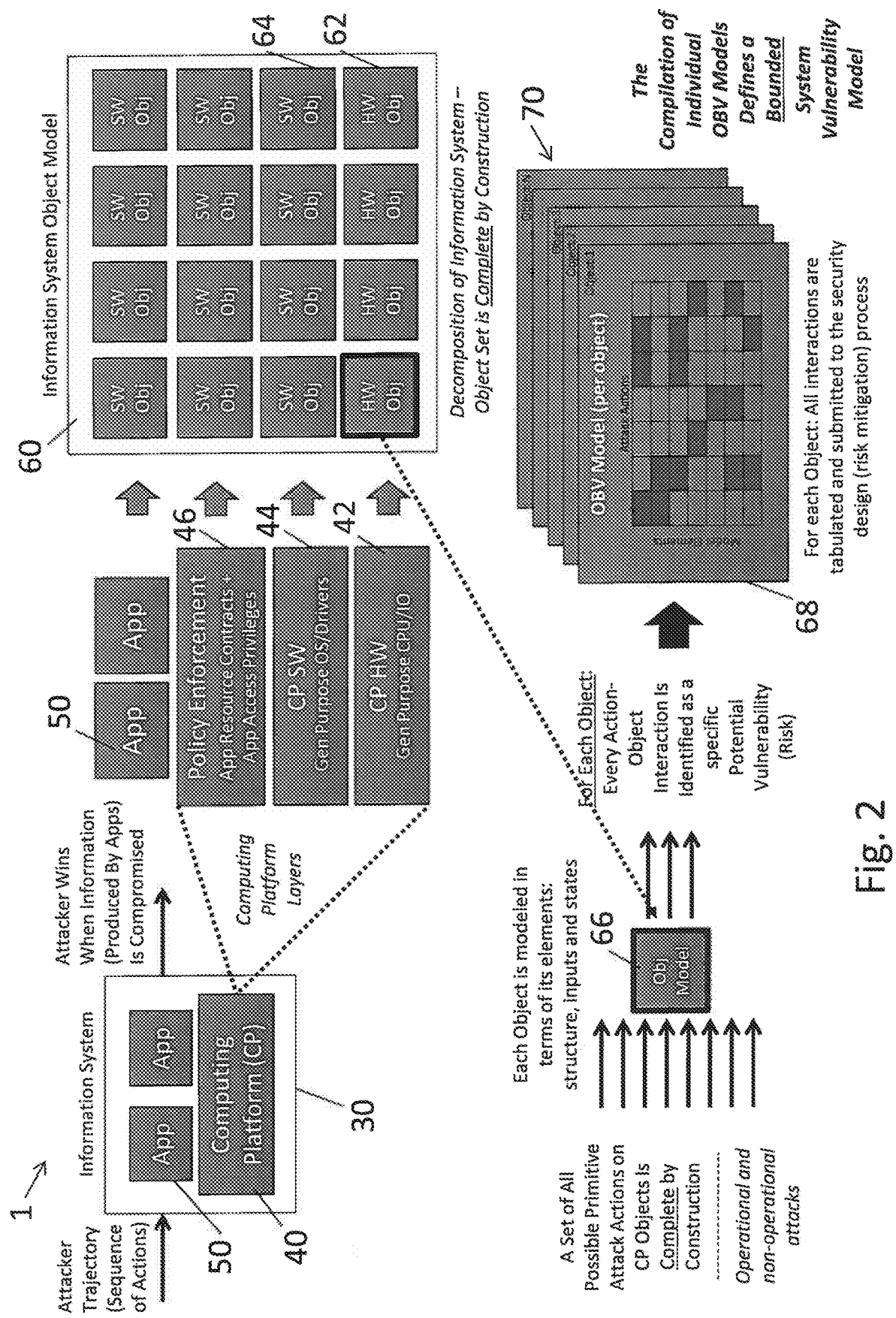
FIG. 2 is a simplified diagram of the object based vulnerability model.

Referring now to FIG. 2, a simplified diagram of an object based vulnerability model 1 is shown. An information system 30 is shown to include computing platform 40 and applications 50 hosted on the computer platform 40. The computer platform 40 can be decomposed to include computer platform hardware 42 including general purpose central processing units with associated input/output devices and computer platform software 44 with general purpose operating system and drivers. The computer platform 40 also includes a policy enforcement module 46 that implements certain security policies for the computer platform 40. It should be appreciated, each hardware component and software component that makes up the information system 30 can be decomposed to a plurality of objects 60 to include hardware objects 62 and software objects 64. Each object is then modeled in terms of its structure, inputs and states to provide an object model 66. The objects structure, state and inputs are the elements of the objects attack surface. For each object, every action-object interaction is identified as a specific potential vulnerability risk. As to be described further hereinafter, from the latter, an object based vulnerability matrix 68 is created where for each object, all interactions are tabulated and submitted to a security design (risk mitigation) process. The compilation of each individual object based vulnerability (OBV) matrix as a collection defines a bounded system vulnerability model commonly referred to as object based vulnerability model (OBVM) 70.

Under the OBV model, an attack alphabet is defined as the complete set of actions operating on the complete set of system functional objects. Actions affect functional objects by manipulating elements of their attack surface. Each action/element interaction has one of 3 possible outcomes: (a) no interaction; (b) nonessential or (c) essential. No interaction means the action is incapable of manipulating the element (e.g. physically impossible). Nonessential means interactions are not needed for system operation. A key security objective is preventing nonessential interactions. Essential means interactions are needed for system operation. Essential interactions may create expected and/or undesirable outcomes (usually distinguishing between the two outcomes is infeasible). A system must allow these interactions as otherwise would prevent desired system behavior as well as undesirable outcomes.

As to be described further hereinafter, an attacker sets off a sequence of actions, also referred to as an attack trajectory on the information system 30 and the attack succeeds if the information produced by the apps is compromised. The OBVM provides a methodology to reduce or eliminate the opportunity for an attacker to compromise the information system 30 by preventing or detecting any one of the sequence of primitive attack actions.

The OBV model starts with a high level system design. A system vulnerability model must comprehensively represent a system to identify all residual vulnerabilities (RV) and requires capturing the entire system design. The OBVM recognizes computing systems are composed of hardware devices, firmware, and software modules, collectively called components. A design's block diagram and bill of materials (BOM) lists all hardware devices, including devices containing firmware. The software build list identifies all software modules in the system and the software block and context diagrams show their relationships. Together, these specifications completely identify all hardware devices, is firmware, and software components in a system. The OBV modeling process starts from this component list to ensure complete system coverage.

Figure 2A:
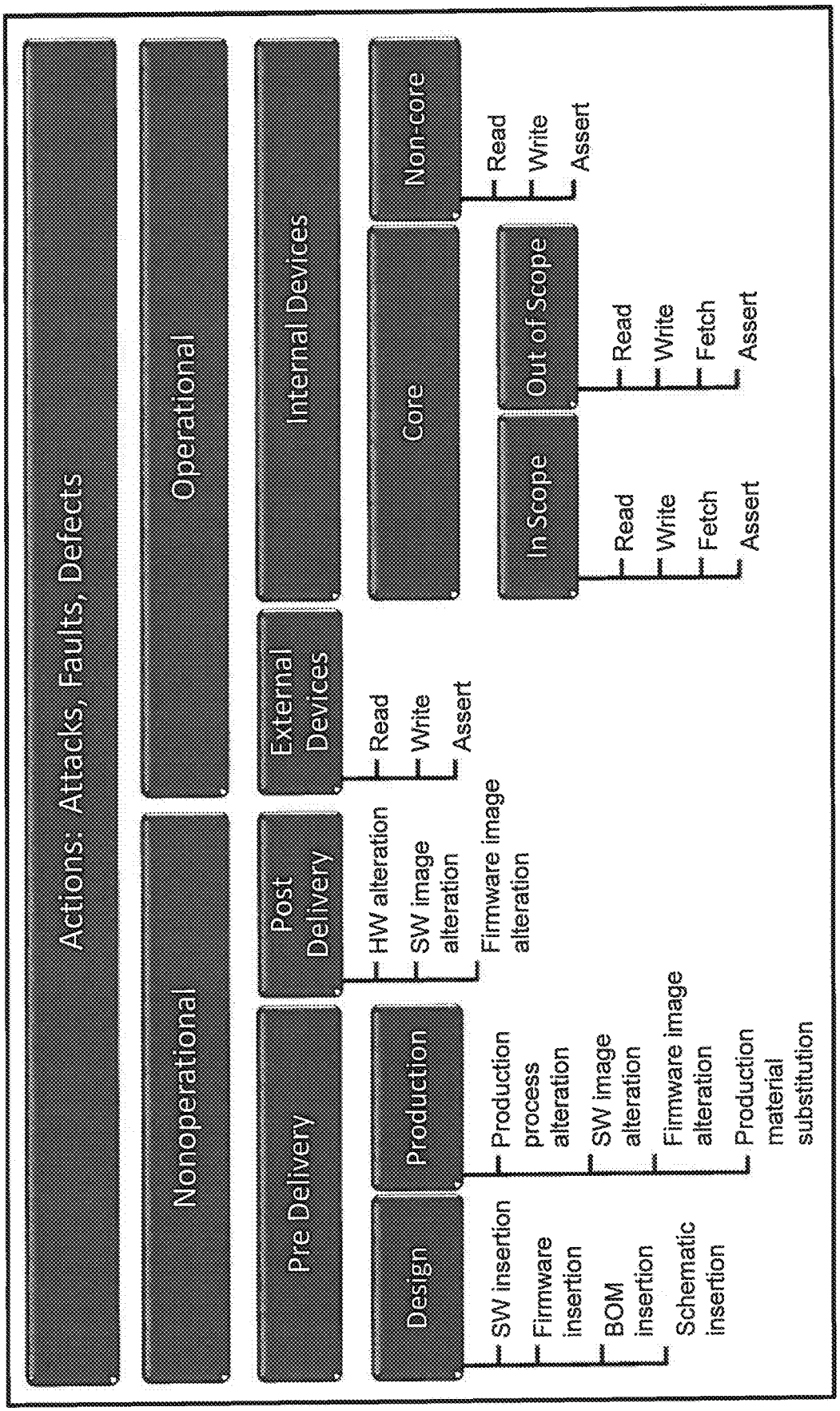
FIG. 2A is an illustration of the various actions that make up a list of actions in an information system.

Referring now to FIG. 2A, an illustration of one embodiment of the various actions that make up the list of actions in an information system. The various actions that are introduced can be segregated when the system is nonoperational and operational. When the system is nonoperational, actions can be segregated as pre-delivery and post-delivery. At pre-delivery during the design stage, software, firmware, bill of materials and schematics provide the information to capture the concerned actions. At pre-delivery, during production, production process alteration, software alteration, firmware alteration and production material substitution provide the information to capture the concerned actions. During post-delivery, hardware alterations, software alterations, and firmware alterations provide the information to capture the concerned actions. When the system is operational, actions can be segregated to external devices and internal devices. Actions to include read, write and assert by external devices need to be captured. For internal devices, core actions of in scope and out of scope exist and non-core actions exist. For in-scope actions, read, write, fetch and assert occur. For out of scope actions, read write, fetch and assert occur. For non-core actions, read, write and assert occur. The latter list of actions is populated along the top of the OBV matrix 68 (FIG. 2) to capture the interaction between actions and the elements of the components of the information system.

Figure 3:
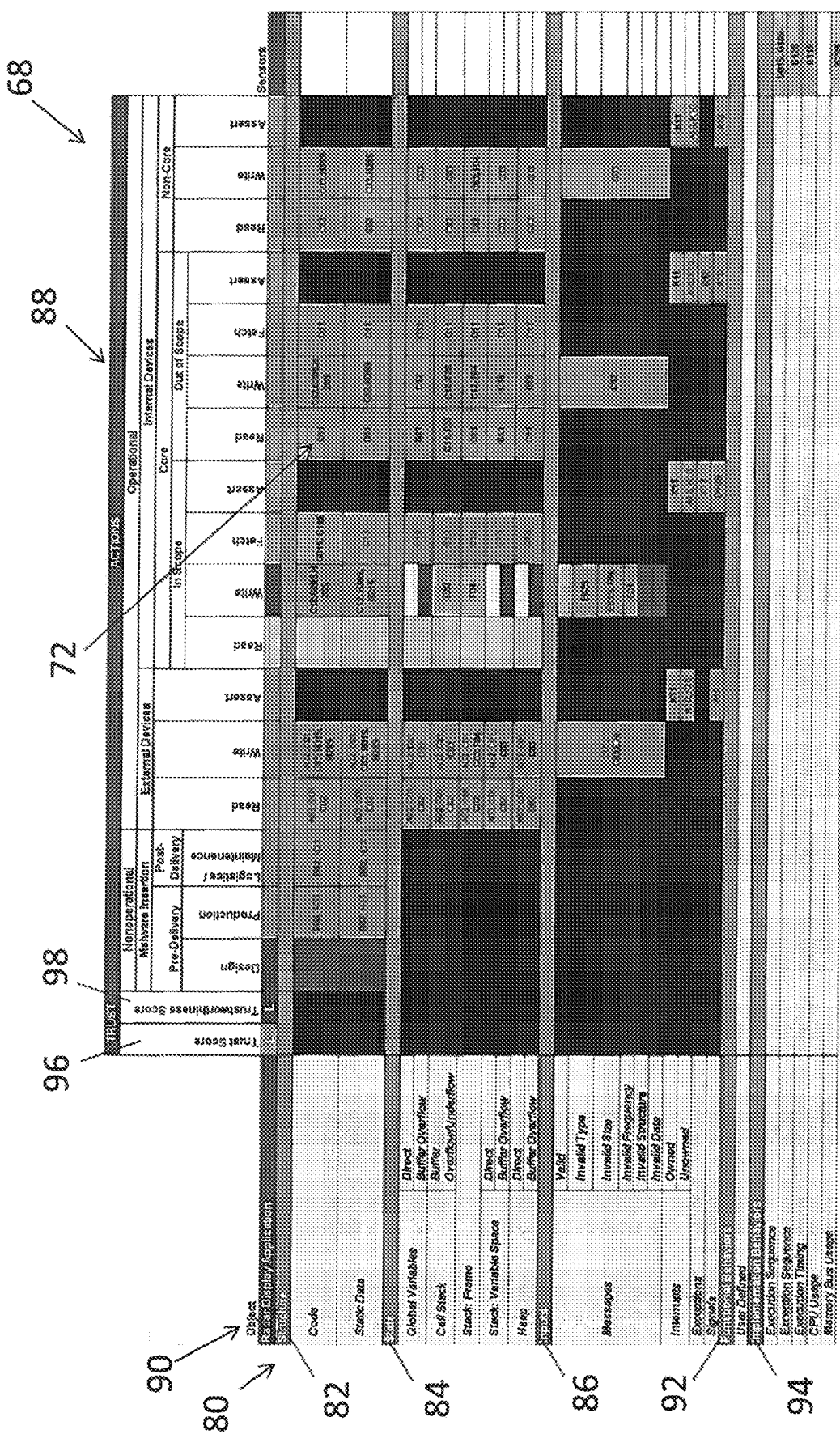
FIG. 3 is a detailed diagram of an object based vulnerability matrix.

Referring now to FIG. 3, an OBV matrix 68 decomposes components into one or more functional objects 90 which further decomposes into elements 80. The elements 80 include: structure 82, state 84, and inputs 86. The functional objects 90 also include functional behaviors 92 and implementation behaviors 94. The structure 82 captures information that is inherent to the object, such as gates, code, static and pseudo static data, and configuration register values. The state 84 captures information that change during operation, such as variables, buffers, stack, heap, and registers, including control registers and status registers, contents. The inputs 86 include information on messages, function parameters, discrete signals, and IO buffers. The functional behaviors 92 are defined as the work performed by a functional object are represented by outputs produced and system state transitions. Functional behaviors reflect the expected, designed performance of a functional object. Functional behaviors are implementation agnostic; any equivalent implementation will, by definition, exhibit the same functional behavior. Implementation behaviors 94 are defined as observable system behaviors (side effects) that occur when a functional object executes such as execution flow, resource usage, and internal state transitions. By definition, implementation behaviors depend on specific functional object implementation.

Components are decomposed into functional objects of the same type. Hardware, software and firmware components consist of, respectively, hardware, software, or firmware functional objects. Characterizing a complete system attack alphabet requires decomposing objects to the correct granularity as discussed further hereinbelow.

The OBV defines actions 88 as the "atomic" operations supported by a given computing system for manipulating objects within that system. Expressed as "initiator⊗ (target)", where ⊗ represents access operations enabled by the computing system's design; initiator represents system entities that can perform those operations; and target represents system locations the operation can manipulate. Examples of access operations include: read, write, execute, and supply chain insert. Examples of initiator include cores, internal peripherals, external devices/buses, and supply chain attacker. Examples of target include same app, different app, or operating system (OS); physical memory; hardware; and software. Target is used to help abstract actions and define their scope but is excluded from the action description. It should be appreciated each object element intersects with an action where interactions 72 can occur.

Preventative Countermeasures (PCMs) and sensors are used to mitigate nonessential interactions. PCMs are techniques that prevent actions from manipulating object elements (structure, state, or inputs), mostly by blocking access. PCMs will map to existing objects in the OBV Matrix or may lead to the addition of new objects as the matrix fidelity is refined. PCMs typically are derived from a target class of interaction rather than specific actions/element interactions. Such PCMs should apply to all component elements in a target class.

Sensors are used to detect observable effects in a system. While sensors do not prevent an interaction from occurring in a system, sensors can detect the interaction and allow software to perform a configurable system response (i.e. Reactive Countermeasures described hereinafter) to protect system integrity.

As countermeasures are added to the system to mitigate nonessential interactions, it may be determined that some countermeasures are effective in protecting a portion of an element but do not protect other portions of an element. In this case, the fidelity of the OBV is insufficient and an element must be decomposed further to clarify the portion of an element protected by a countermeasure and portion that may not be protected by a countermeasure. For example, interrupts that are expected for a given application are essential. Those interrupts cannot be blocked, but an interrupt quota can be enforced. However, interrupts that are not expected for an application can be blocked. Because there are two different countermeasures applied to two different situations, the element must be further decomposed; in this case, interrupts decomposed into owned and unowned. Essentially, countermeasures applied to a given interaction must completely prevent or detect the interaction on that element.

In the OBV Matrix, countermeasures are represented by unique ID numbers. Colors denote the type of countermeasures that are applied to particular interactions. Interactions colored in blue indicate that PCMs and sensors have been applied to prevent the interaction. Interactions colored in green indicate that sensors have been applied to detect the interaction. Interactions left in red indicate nonessential interactions for which no countermeasures have been applied, as such, noted as residual vulnerabilities.

As countermeasures are added to the OBV Matrix, some countermeasures are not applicable to the element under all conditions. Because of this, these elements must be further decomposed (i.e. split into multiple rows and refine each element) to clarify what is protected by each countermeasure and what is not protected. The additional element decomposition allows specific identification of remaining residual vulnerabilities in the object. For example, while direct access to the software's variables, stack, and heap are essential, buffer overflow into those elements are nonessential and no countermeasures have been applied for them. These interactions are marked in red to note that they are residual vulnerabilities resulting from unmitigated nonessential interactions. Interactions marked in yellow indicate residual vulnerabilities resulting from unmitigated essential interactions. The set of red and yellow interactions define the unmitigated actions available to attacker access, otherwise known as the viable attack alphabet on that object.

It should be noted that PCMs and sensors, while completely preventing or detecting a particular interaction, are subject to its own vulnerabilities. An attacker could modify or bypass the countermeasure applied on that interaction. These vulnerabilities are documented outside the OBV Matrix in countermeasure trees (CMTs).

Any unmitigated interactions must be analyzed to assess the possible effects of those interactions. Potential effects include element corruption (i.e. element changed as a result of interaction), a change in functional behavior (i.e. element was changed causing the object's intended behavior to change), or a change in implementation behavior (i.e. element was changed causing other behaviors to change). If these effects can be reliably detected, then corrective action steps can be invoked to maintain system integrity. The corrective action step(s) are referred to as reactions (also referred to as a 'reaction plan'). Element corruption effects are noted as part of the interaction for that element; by definition, an action affecting the object element may cause corruption. Sensors that detect the effect of the element corruption are noted in that interaction.

Modification to an object's structure, state, and inputs can cause a change in functional and implementation behavior. While it may be possible to observe this effect, it is generally not possible to attribute the effect to a given action. For example, a change to the application's execution flow can be caused by modification to the code, variables, or inputs. These modifications can be caused by an attacker within the same application space (via malware insertion), from an external application, or an external device. Instead, behavioral sensors are applied to the object element in whole, not as countermeasures for a particular interaction.

Sensors combined with a reaction plan are referred to as Reactive Countermeasures (RCM). Once an object is compromised, reliably determining the extent of its corruption is impractical; thus the focus of the RCM is on restoring CP capability (i.e. shut down an application and reload it). Since the scope of a compromise is unknown, restoring a compromised object may not be sufficient, thus RCMs may impact entire modules or units. The system integrity impact of a specific compromise determines the optimal plan for restoring the CP integrity and functionality.

RCMs enable security architectures to mitigate attacks regardless of the attacker's objective or the sequence of actions employed by the attacker. The security architecture becomes more effective as the sequence of steps in the attack vectors increases. The more steps required to complete the attack the higher the probability the attack trajectory induces a detectable effect which can trigger a reaction that can reestablish system integrity.

The OBV Matrix documents only the sensor portion of the reactive countermeasure and not its reaction plan. The responsibility of defining reaction plans is split between system design representatives and users. System design representatives are responsible for defining reaction plans for the security architecture while users are responsible for defining reaction plans for their own applications.

Figure 4:
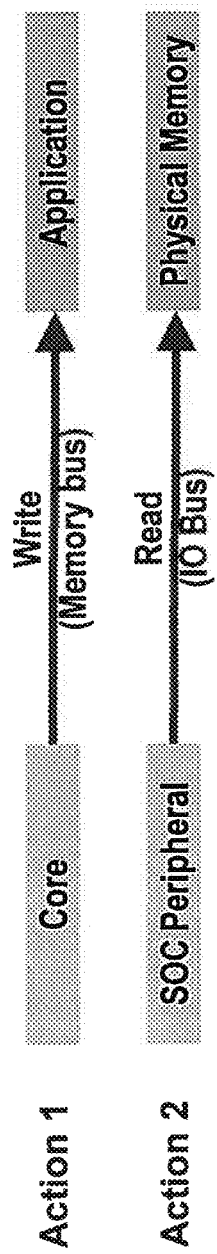
FIG. 4 is a diagram showing an example of an initiator operating on a target.

Referring now also to FIG. 4, each action represents a potential access path. For example, a core write to the same application, a core read from a different application (not shown), an IO bus write to physical memory (not shown), and an IO bus read from physical memory. The actual access path is derived from context where the specific object is manipulated by the action. Initiators, operations, and target classes are derived from: general computing system architecture, design, and capabilities; augmented by unique system capabilities and features; developers can identify a computing system's complete action list through design analysis. Proper action abstraction is crucial to identifying design-independent RVs, a prerequisite for uniformly comparing security solutions. Contrast defining an object as residing in a virtual machine (VM) versus an application; only virtualized systems have VM; all systems have applications.

Actions can be nonoperational or operational. Operational actions occur when the information system is executing in its normal operating environment. Nonoperational actions occur at all other times. Examples of nonoperational actions include, in pre-delivery, design and production and, in post delivery, logistics and maintenance activity. Operational actions can occur in external devices and internal devices in the core, as in scope or out of scope, or in the non-core. Examples of operational actions include read, write, fetch and assert. Table I provides a sample operational action list.

TABLE I

| Operations | Sources | Targets | Actions |
| --- | --- | --- | --- |
| Read | Cores In Scope | Gates (Hardware) | In Scope core write |
| Write | Cores Out of Scope | Bits (Memory) | In Scope core read |
| Fetch/Execute | Devices Internal | System Memory | In Scope core Fetch |
| Assert | Devices | Internal | Out of Scope core write |

TABLE I-continued

| Operations | Sources | Targets | Actions |
| --- | --- | --- | --- |
| | External Malware Insertion | Memory OCSR | Out of Scope core read |
| | | GPR | Out of Scope core fetch |
| | | SPR | Malware insertion—design |
| | | FPR | Malware insertion—production |
| | | Vectors | Internal device write |
| | | | Internal device read |
| | | | Internal device interrupt |
| | | | External device write |
| | | | External device read |
| | | | External device interrupt |
| | | | External device assert |

Higher level attacks can be decomposed into the above primitive actions. For example, a root kit attack utilizing cache poisoning requires multiple local core writes to memory and at least one internal interrupt.

Well defined actions and objects will maximize nonessential outcomes and minimize ambiguous essential outcomes. As shown in FIG. 3, the OBV model is represented as a two-dimensional matrix. Each row represents one element of a functional object. Each column represents one action. Each cell in the matrix represents the interaction between one action and one element. The outcome of each interaction is captured in its associated matrix cell.

The matrix thus captures and categorizes all interactions between all system objects and actions, i.e. the system's attack alphabet. The attack alphabet is complete if the object and action sets are complete.

The OBV defines effects as the impact resulting when an action manipulates an object. Effects are structural changes (integrity violations) or changes in system functional and implementation behaviors. Actions manipulate (modify) single object elements, but may induce multiple behavior changes. Effects represent either intermediate attacker goals or unintended side-effects, not the attacker's final objective. Since interactions represent primitive steps, attacks rarely achieve final objective with just one interaction. Effects indicate an object's, hence system's, integrity is compromised. Multiple actions may create the same effect(s); tracing effects to instigating action is thus impractical. System developers capture observable effects associated with manipulated functional objects in the OBV matrix.

Figure 5:
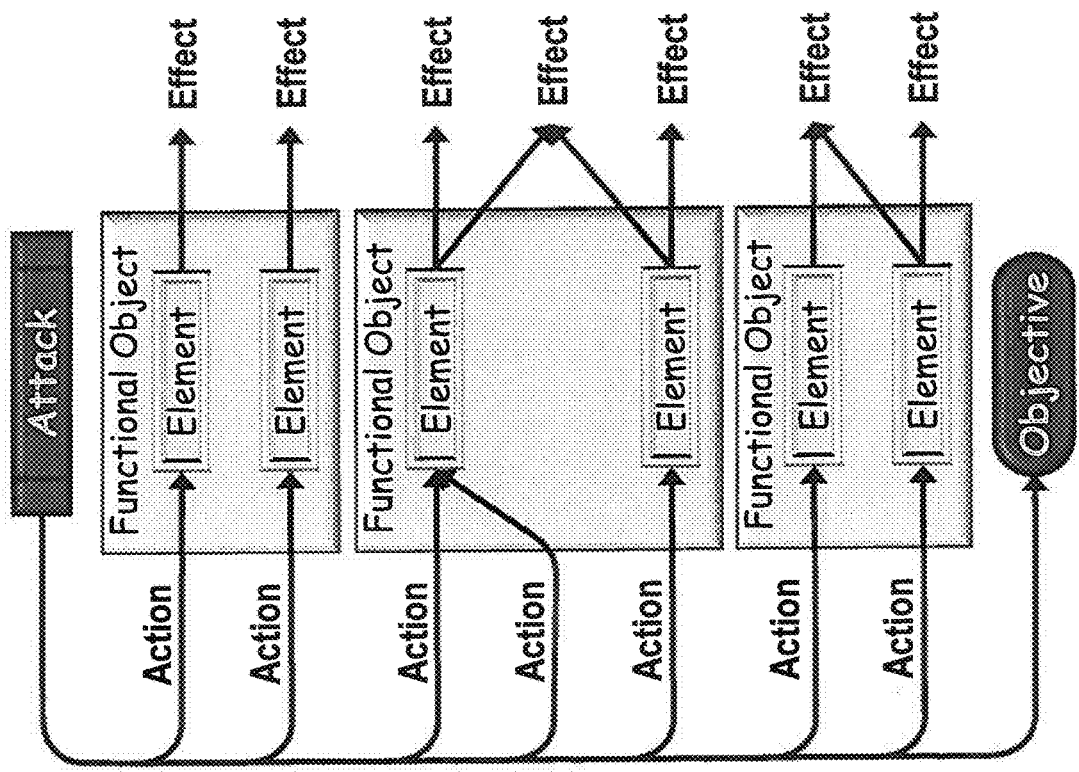
FIG. 5 is a diagram showing an example of the steps an attacker must take to reach an objective.

Cyber attacks can be defined as a series of actions manipulating a series of object elements to achieve an objective of benefit to an attacker. Referring now to FIG. 5, a diagram illustrating the actions an attacker must take against the functional object elements to reach an objective is shown. Starting at the top, an attacker would need to perform the action shown on a particular object element, which causes a particular effect. As to be described herein after, for certain object elements, a preventive countermeasure (PCM) can be applied to block the interaction with the object element. For the object elements that have interactions that cannot be blocked by a PCM, a sensor can be useful to monitor the effect and when detected, a reaction plan can be invoked to restore the system from the effects of the interaction. The latter prevents the objective from being obtained.

Sample effects include element corruption which can be on object's structure such as gates, firmware, code, static data tables/structures, including policy artifacts or configuration registers with persistent contents (i.e., static) and state to include the stack (variables, buffers, and frames), global variables (data buffers, IO buffers), heap (data buffers, IO buffers), control and status registers, and core registers (GPR, SPR, and FPR). Sample effects also include delta functional behavior where system functions do not perform as designed to include effects specific to each function and are of main concern are system security functions. Sample security policy violations of concern are messages having: an invalid message type (includes unauthorized service accesses), exceeding a message quota or violating a Cross Domain Solution (CDS) rule. Policy violations for memory protection are also a concern with Memory Management Unit (MMU) write, read, execute, and address protection violations; OS (IO Device) memory access violations; and peripheral/external device Peripheral Access Management Unit (PAMU) access violations.

Sample effects also include improper implementation behaviors to include code flow integrity violations consisting of: executing authorized code in incorrect sequence or timing; executing "dead" code; executing unexpected (maliciously inserted) code; executing illegal (unsupported) instruction; executing unauthorized instruction; or reaching an unexpected error condition ("panic"). Another improper implementation behavior includes where a resource usage is out of expected bounds such as CPU usage out of expected bounds; memory bus usage exceeds expectations; data transport resource usage exceeds expectations; interrupt frequency exceeds expectations; expected memory allocation exceeds expectations; cache usage (hits/misses) exceeds expectations; memory access patterns (open memory pages) exceeds expectations; or TLB usage (hits/misses) exceeds expectations.

A proper cyber defense solution considers the set of actions on objects, their behaviors, and observable effects to construct a layered defense consisting of: preventative countermeasures to prevent nonessential manipulation of functional object elements by actions and reactive countermeasures to detect effects (sensors) and restore system integrity and maximize availability/functionality (reactions). The cyber defense solution should mitigate attacks without needing to know the attack's ultimate objective. The cyber defense solution should mitigate attacks without needing to know the sequence of actions employed by an attack. It must avoid analyzing attack taxonomies and characterizing individual attacks. The cyber defense solution should become more effective as attack interactions increase by increasing probability of preventing or detecting at least one interaction. The cyber defense solution must be design centric rather than attack centric.

Preventive countermeasures (PCM) are techniques that prevent actions from manipulating object structure, state, or inputs, mostly by blocking access. Examples include virtualization, access (read, write, execute) protection (MMU/PAMU), system configuration. Other types of PCMs include cryptography and supply chain mitigations. PCMs will map to existing objects in, or add new objects to, the OBV. PCMs are often derived from target class rather than specific object attack surface elements. Actions define system access paths; PCMs moderate those paths. Such PCMs apply to all component elements in the target class. PCMs alone are insufficient to mitigate all actions (attacks). PCMs can't prevent essential interactions as this would prevent normal system operation. Operational PCMs are generally ineffective against supply chain attacks.

Figure 6:
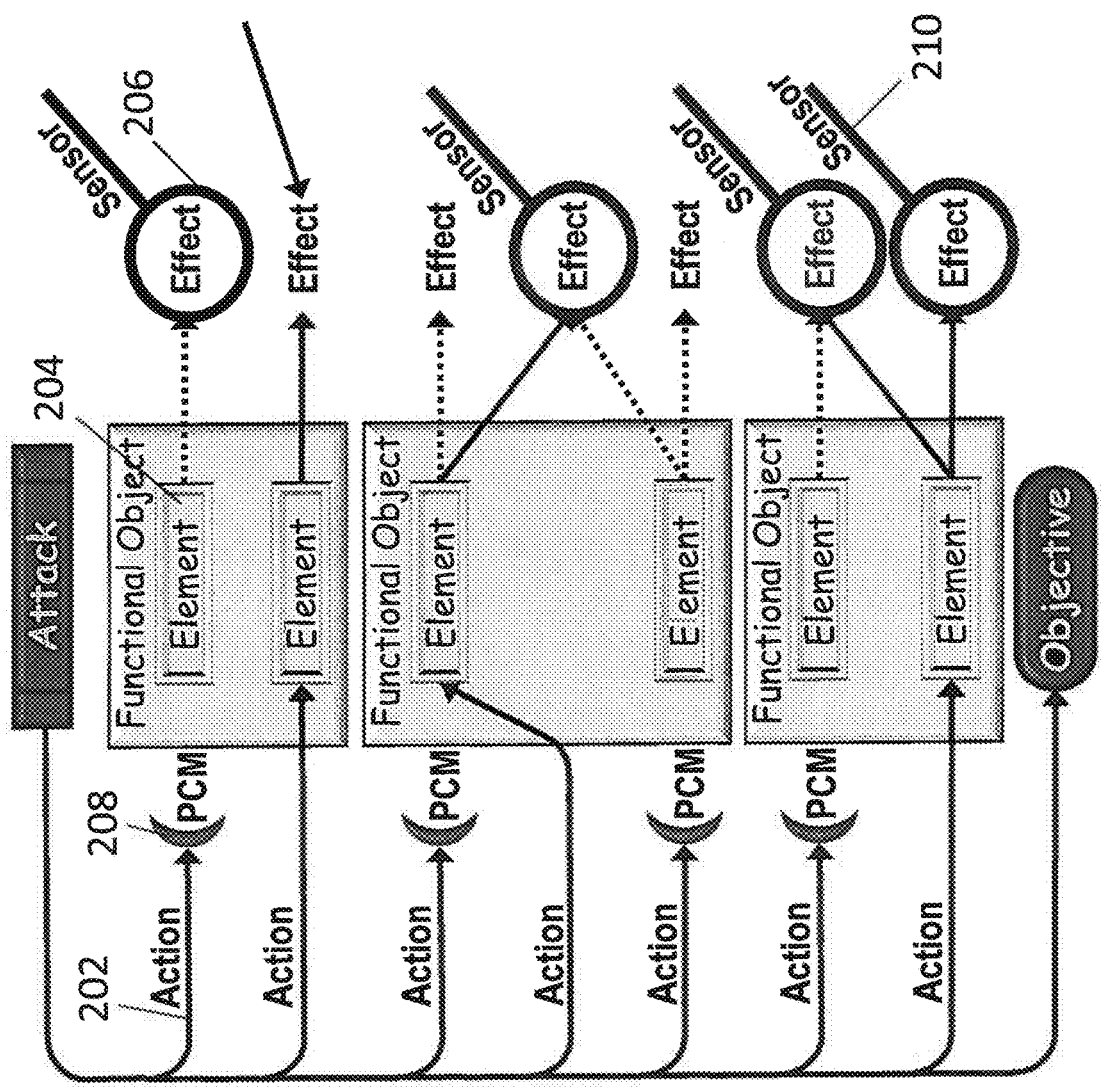
FIG. 6 is a diagram showing examples of preemptive steps to the steps an attacker must take to reach an objective.

Referring now to FIG. 6, sensors detect effects and any effect is theoretically observable. In practice, an effect is observable only if a sensor can feasibly detect it. A cyber defense solution deploys sensors to verify structural integrity; verify/monitor functional behavior such as run time verification checks and policy violation sensors; and monitor implementation behavior such as execution flow (e.g., branch tracing, check codes) and resource usage (e.g., memory and IO bus bandwidth). Reactions are triggered when effects are detected by sensors. It implies an object is potentially no longer performing as expected and is compromised. Reactions are aimed to restore or maximize a compromised system's integrity and functionality. The main criteria driving reaction selection are the objects compromised and the compromise's impact on confidentiality, integrity, and availability. Consequences are defined by object's trust and mission criticality. The action instigating the detected effect is rarely used to select reactions. Since multiple actions generate the same effects, one usually can't trace an effect back to its root cause (action). Conversely, a detected effect is often used as a reaction criteria.

In practice, mitigating compromises requires multiple distinct corrective steps; a reaction plan. Reaction plans consider spatial, temporal, and criticality factors when mitigating compromises. For example, with spatial, we determine the potential scope of compromise and corrective steps. With temporal, we determine what corrective steps taken may change per occurrence. Such as the first time, we restart a corrupted application, whereas the second time we reload a corrupted application and the third time we quarantine the application and capture for later forensic analysis. With criticality, we determine the consequences of the object corruption on the system. Reactions are often crafted per component or object class, but are invoked on individual instantiations of that component, such as a cross-domain guard and can vary by instantiation characteristics such as resetting all guards or just guards handling specific cross-classification messages.

Once an object is compromised, reliably determining the extent of its corruption is impractical hence the focus is on restoring the system, not objects. Since the goal is system restoration, reaction plans may affect multiple objects, possibly the entire module or unit. Restoring just the detected compromised object may not suffice to restore the system integrity and/or functionality and compromised objects can't be trusted to restore themselves. Many reactions only operate on systems, units or components not individual functional objects or elements although minor exceptions exist. The confidentiality, integrity, availability, and system integrity impact of a specific compromise determines the optimal plan for restoring system integrity and functionality. The latter is a System Security Engineering task using Integrated Response Management (IRM) and guided by system design and OBV data.

The Cyber Defense Solution reacts to detected compromises by linking sensors to compromised objects to reaction plans defined by IRM.

Figure 7:
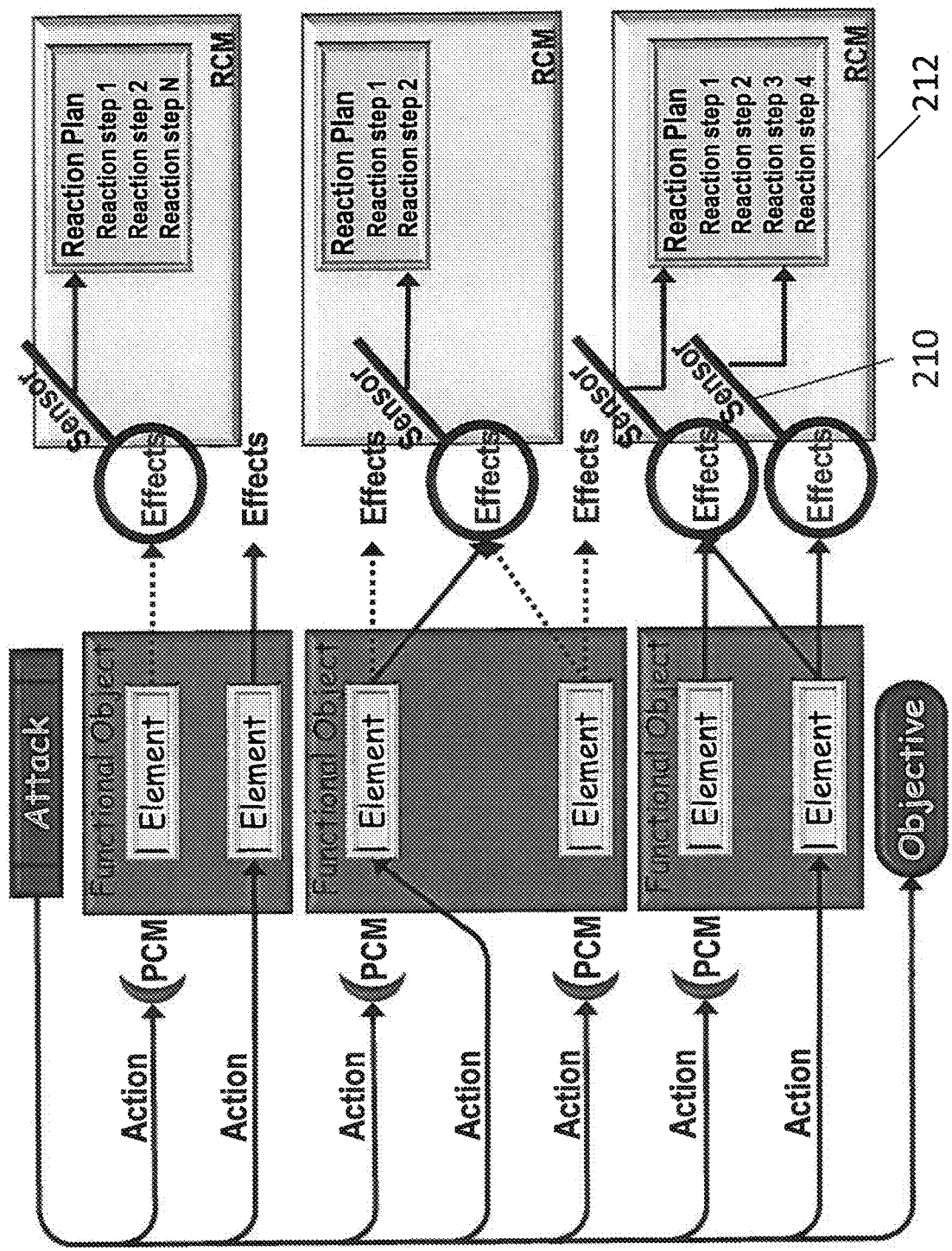
FIG. 7 is a diagram showing examples of reaction steps taken to stop an attacker from reaching an objective.

Referring again now to FIG. 6, a diagram illustrating a potential attack trajectory after the countermeasures are applied is shown. Starting at the top, an attacker would perform the action 202 shown on a particular element 204, which causes a particular effect 206. For certain elements, a preventive countermeasure (PCM) 208 can be applied to block the action 202 on the element 204. For the elements that have interactions that cannot be blocked by a PCM, a sensor 210 can be useful to monitor the effect and when detected, a reactive countermeasure (RCM) can be invoked with a reaction plan to overcome the effects of the action as shown in FIG. 7. The latter prevents the objective from being obtained.

Trust is the level of reliance placed on a system component by the system design; that it will behave as expected. Trustworthiness is the level of confidence established in a system component; can be viewed as the likelihood a component will not fail to behave/perform as designed/expected, for example a supply chain compromise. A Trust Gap arises when components are deemed insufficiently trustworthy as compared to their trust. A trust gap requires further mitigation by reducing the trust required (such as by design changes) or by increasing trustworthiness (such as by supply chain mitigation). Referring again to FIG. 3, the OBV matrix 68 (FIG. 3) captures a trust score 96 and a trustworthiness score 98.

Trust analysis identifies which components the system trusts to enforce each security policy and analysis is guided by system security policies. Security policies put constraints on system transactions necessary to protect the confidentiality, integrity, and availability of data (e.g. domain separation). Trust analysis requires detailed knowledge of the specific system design to include all enforced security policies, all hardware and software components, and how system components interact to enforce each security policy. Each of the above are described in the system design documents. This information enables designers to identify which components enforce which security policies and the consequences on each security policy of a component failure. Trust assessment is wholly dependent on system design and how components are employed to enforce security policies.

To calculate a trust score for each component or system element, the trust score is determined by the severity times the dispersion attributed to that component. The trust score is an objective measure of trust. Here, the severity is determined by the policy violation consequences and is given a score. A score of [3] or High is given when a security system/artifact corruption or data spill across domains will occur. A score of [2] or Medium is given when there is user data corruption or loss. A score of [1] or Low is given when there is a domain access policy or resource quota violation. A score of [0] or No is given if the component does not enforce any security policies. The dispersion is determined by the number of components that must fail in order for policy violation to occur. A score of [3] is given for 1 component, a score of [2] is given for 2 components and a score of [1] is given when there are 3 or more components. The number in the square brackets list severity and dispersion scores. A trust score is assigned to components; if a component enforces multiple security policies, assign maximum score of the policies it enforces. The trust score ranks components as a guide to trustworthiness assessment as to be described.

Trustworthiness is the level of confidence established in a system element. It can be viewed as the likelihood a component will not fail to behave or perform as designed or expected (e.g. supply chain compromise). Three major factors contribute to trustworthiness: vendor, pedigree and complexity. The vendor factor is determined by the company(s) manufacturing or authoring the component, country(s) of origin, and the vendors processes for securing their supply chain throughout the chain of custody from development, manufacturing, product handling, to operational use; essentially the vendors reputation for delivery of reliable, unaltered components. The pedigree is determined by previous, current, and planned component usage and previous evaluations of any type; essentially, the components exposure to scrutiny. The complexity is determined by the number of gates or lines of code and functional complexity; essentially the probability of finding any inserted malware in the component.

Supply chain attacks aimed at enabling operational attacks include: targeted hardware and software malware insertion, i.e. insert malware to compromise a specific product; untargeted hardware and software malware insertion, i.e. add exploitable vulnerability to system (e.g. add backdoor to security software); system discovery meaning discover existing, undocumented features which could be exploited in future RE or cyber attacks; and insider attack meaning trusted employees add exploitable vulnerabilities to a system.

A trustworthiness assessment is performed for each component or system element. Initially during phase 1, a preliminary assessment is performed where the country of origin and vendor is used to assign a preliminary trustworthiness "score" to each component. For example, components developed in-house using trusted processes have a high level of trustworthiness. Also, components wholly developed within the US by reputable companies with known supply chain protections may be deemed trustworthy with no further evaluation. Components deemed trustworthy in this phase have High trustworthiness. Components not deemed having High trustworthiness proceed to phase 2, where a detailed vendor investigation is performed. Assess the risk a vendor will deliver compromised components by assessing factors such as facility location, company owners, work force citizenship, supply chain mitigations, and reputation using a service such as Telemus. Components are assigned a trustworthiness score of [1] Low, [2] Medium, or [3] High. Components deemed insufficiently trustworthy as compared to their trust score after Phase 2 are defined as having a trust gap. Identified trust gaps require further mitigation. As shown in FIG. 3, the trust score 92 is captured for each object 90 and the trustworthiness score 98 is captured for each object 90.

Trust gap mitigation must be performed for components having a trust gap. Trust gaps can be mitigated by either decreasing trust required (via design changes) or increasing trustworthiness via Supply Chain Risk Mitigation (SCRM) of a component. For example, design changes that reduce required trust include: restrict privileges by restricting system or components such that less trust is required (for example: restrict a program from accessing memory outside its scope); apply redundancy by adding components to reduce consequence of failure or improve detection of compromise (for example: share trust across multiple components). Examples of supply chain risk mitigation include securing the supply chain to improve the probability that the part meets the specification. For example, choose an alternate component source to change component supplier to a source that is more trustworthy (for example: purchase memory part from United States instead of China). Perform vendor inspections by sending independent inspectors to verify manufacturing/supply chain process an also improve trustworthiness as well as performing blind buys by obfuscating purchaser of part to avoid targeted supply chain attack. Additional supply chain technical mitigations can be performed to verify part meets specification. Perform device specific evaluations, such as performed by the DARPA TRUST program, to verify device design. Perform functional device screening to conduct functional tests to verify part operates as expected, or perform a malware insertion scan to conduct functional tests to check for undocumented features.

Figure 8:
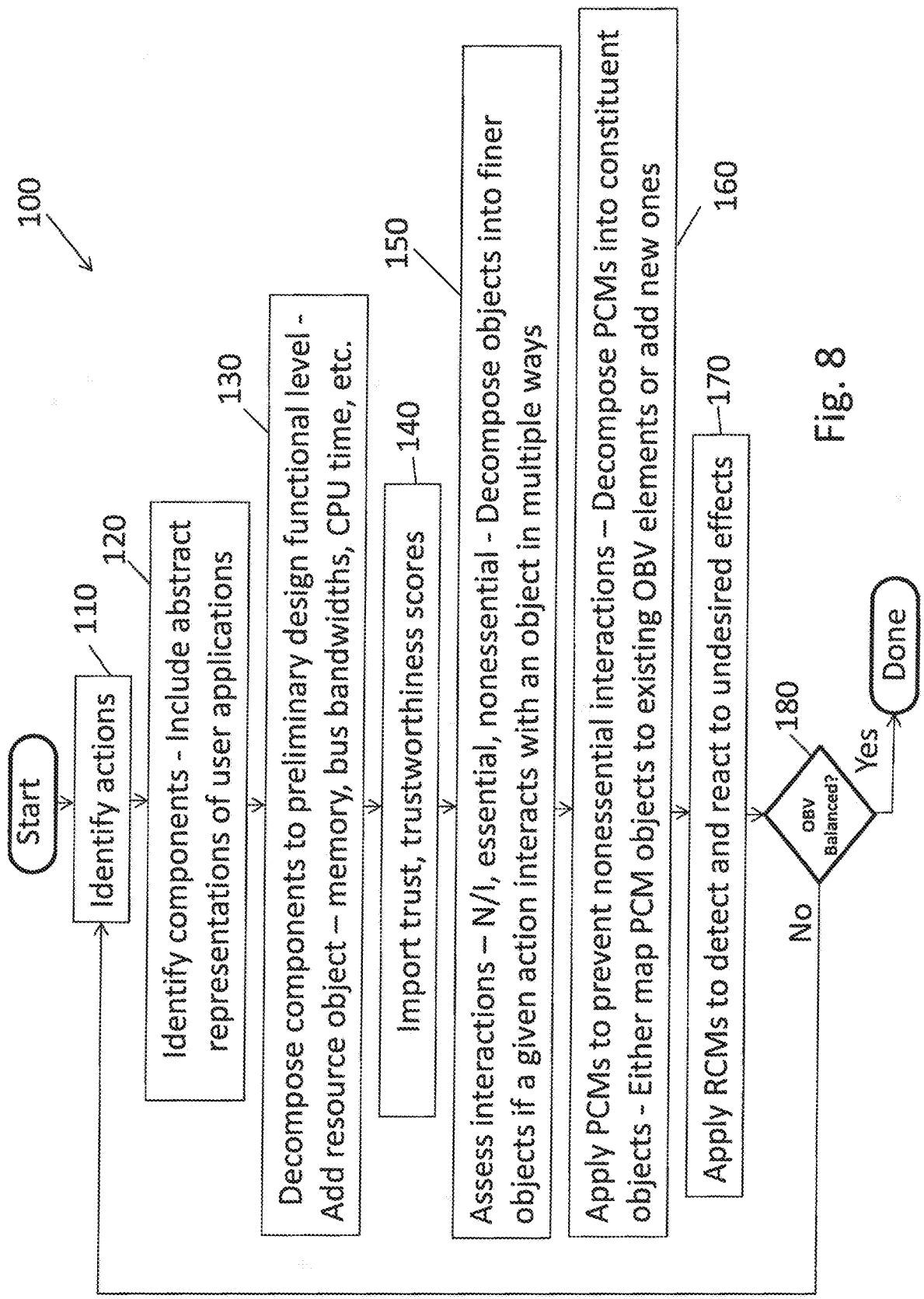
FIG. 8 is a flow chart for implementing the object based vulnerability model and populating the OBV matrix.

Having described the various concepts and features that must be addressed to provide a secure computing platform and referring now to FIG. 3, a more detailed explanation of the OBVM process and populating an OBV matrix 68 will now be described. Referring now also to FIG. 8, a flow chart displaying the steps of the OBVM process 100 is shown. First, an Identify Actions step 110 is performed and then an Identify Components step 120 is performed to include abstract representations of user applications. Next, a Decompose Components to Preliminary Design Functional Level step 130 is performed and added to the set of objects that will make up the OBVM 70 (FIG. 2). Next, an Import Trust and Trustworthiness Scores step 140 is performed where the trust score and the trustworthiness score for the object is captured. Next, an Assess Interactions step 150 is performed where each element is examined and it is determined if there is no interaction (N/I) or if the interaction is essential or nonessential. If necessary, one can decompose the objects into finer objects if a given action interacts with an object in multiple ways. Next, an Apply PCMs to prevent nonessential interactions step 160 is performed. Here we decompose PCMs into constituent objects and either map PCM objects to existing OBV elements or add new ones. Next, an Apply RCMs to detect and react to undesired effects step 170 is performed where RCMs are added to the unmitigated interactions to detect the effect of the interaction and take action as appropriate. As shown in decision step 180, the above steps are repeated until the OBV model has struck a balance and then the process is done. Next, a more detailed explanation of each of the steps will be provided.

Figure 9:
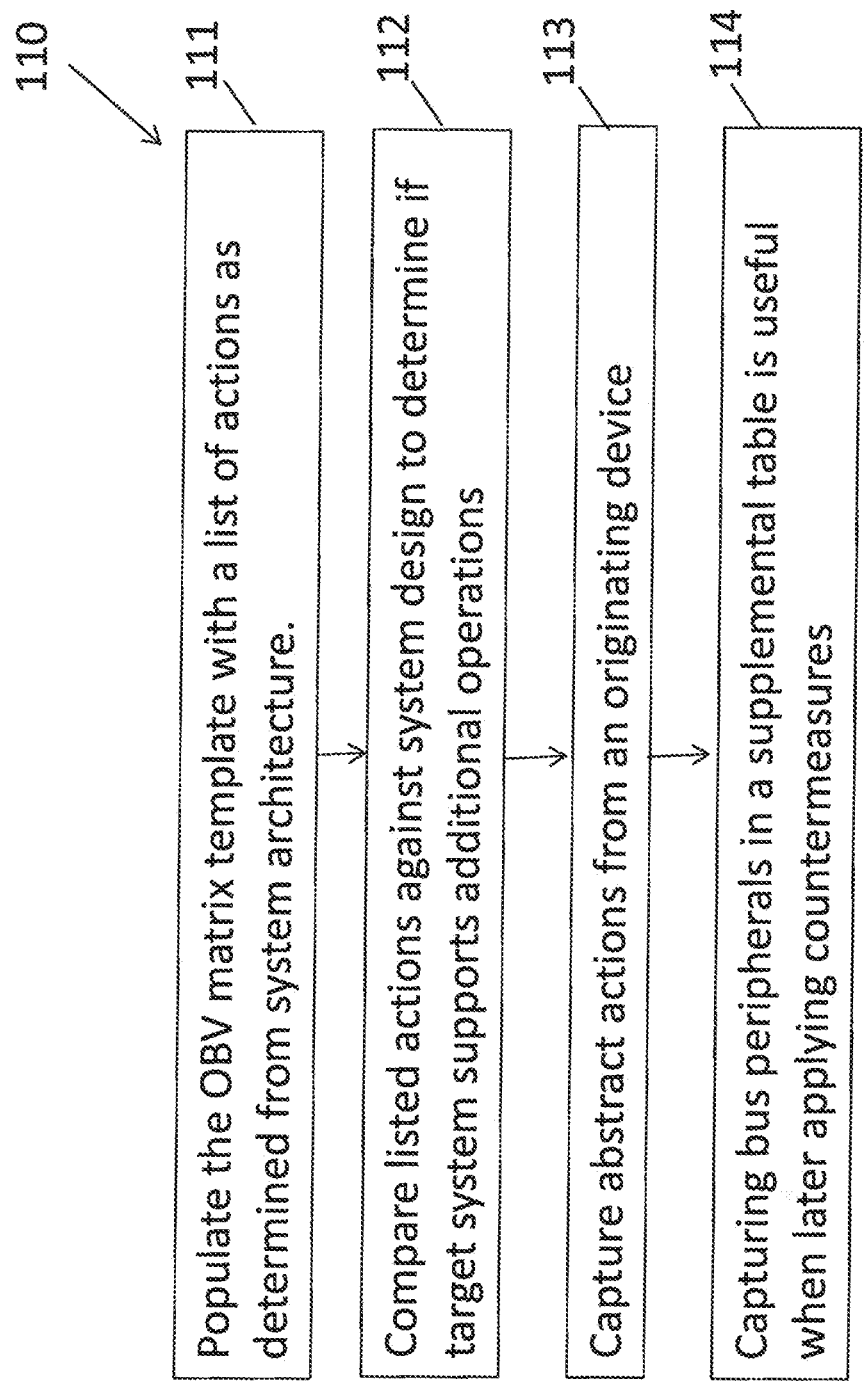
FIG. 9 is a more detailed flow chart of one of the steps in FIG. 8.

Referring now also FIG. 9, looking at the Identify actions step 110 in more detail, in step 111, the OBV matrix template is populated with a set of actions using the guidelines as discussed above with FIG. 2A. In step 112, evaluators should compare a sample list of actions identified against system design to determine if a target system supports additional operations. For example, systems with dual ported memory directly accessible by an external device may present additional memory access operations. In step 113, we abstract actions when necessary into classes of devices instead of a specific originating device. For example, separately enumerating the different peripherals connected to an IO bus is unnecessary, as operation and target are more important than a source. In step 114, bus peripherals are captured in a supplemental table which is useful when later applying countermeasures. If employing significantly disparate countermeasures to mitigate bus operations originating from different peripherals, splitting actions by peripheral may simplify the model. If an action is split, add new columns under parent action to retain mapping to earlier identified actions. Table II shows actions in a sample COTS processor architecture.

TABLE II

Actions

Figure 10:
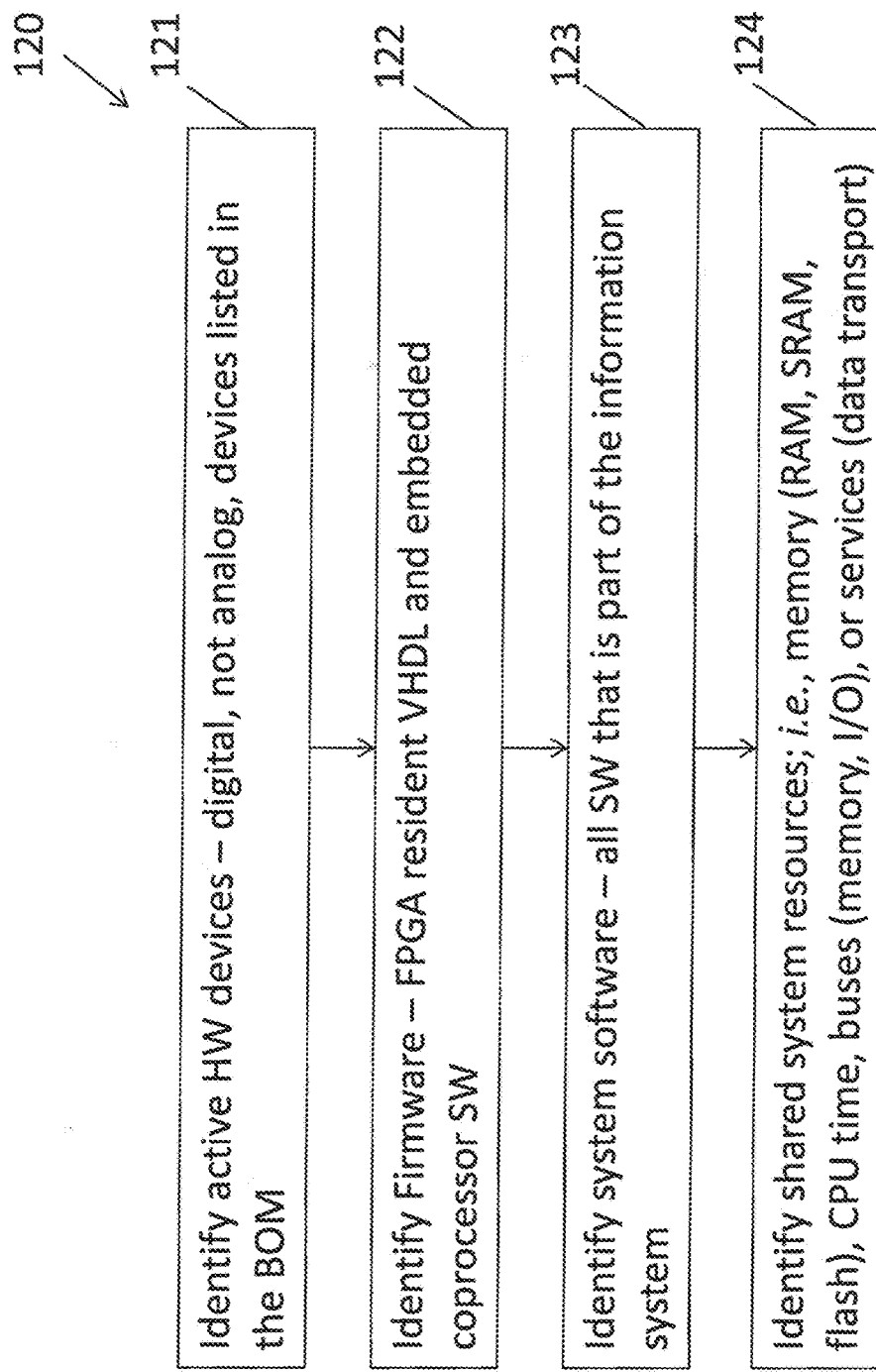
FIG. 10 is a more detailed flow chart of one of the steps in FIG. 8.

In Scope core write
In Scope core read
In Scope core fetch
In scope core assert
Out of Scope core write
Out of Scope core read
Out of Scope core fetch
Out of Scope core assert
Malware insertion—design
Malware insertion—production
Malware insertion—logistics/maintenance
Internal device write TABLE II-continued Actions Internal device read
internal device assert
External device write
Extetnal device read
External device assert Referring now also to FIG. 10, in Identify Components step 120, where all system components are being identified, we first perform step 121 identifying active hardware devices, digital, not analog, devices listed in the bill of materials (BOM). Focus on devices that can control or change logical system behavior and exclude discrete components such as capacitors, resistors, diodes. Vulnerabilities in these devices are dealt with through Supply Chain Risk Mitigation (SCRM), Fail Safe Design Analysis (FSDA), etc. In step 122, all firmware is identified to include FPGAs, resident VHDL and embedded coprocessor software. In step 123, all software within the information system being evaluated is included. In step 124, shared system resources are identified, for example, memory (RAM, SRAM, flash), CPU time, buses (memory, I/O), or services (data transport).

Figure 11:
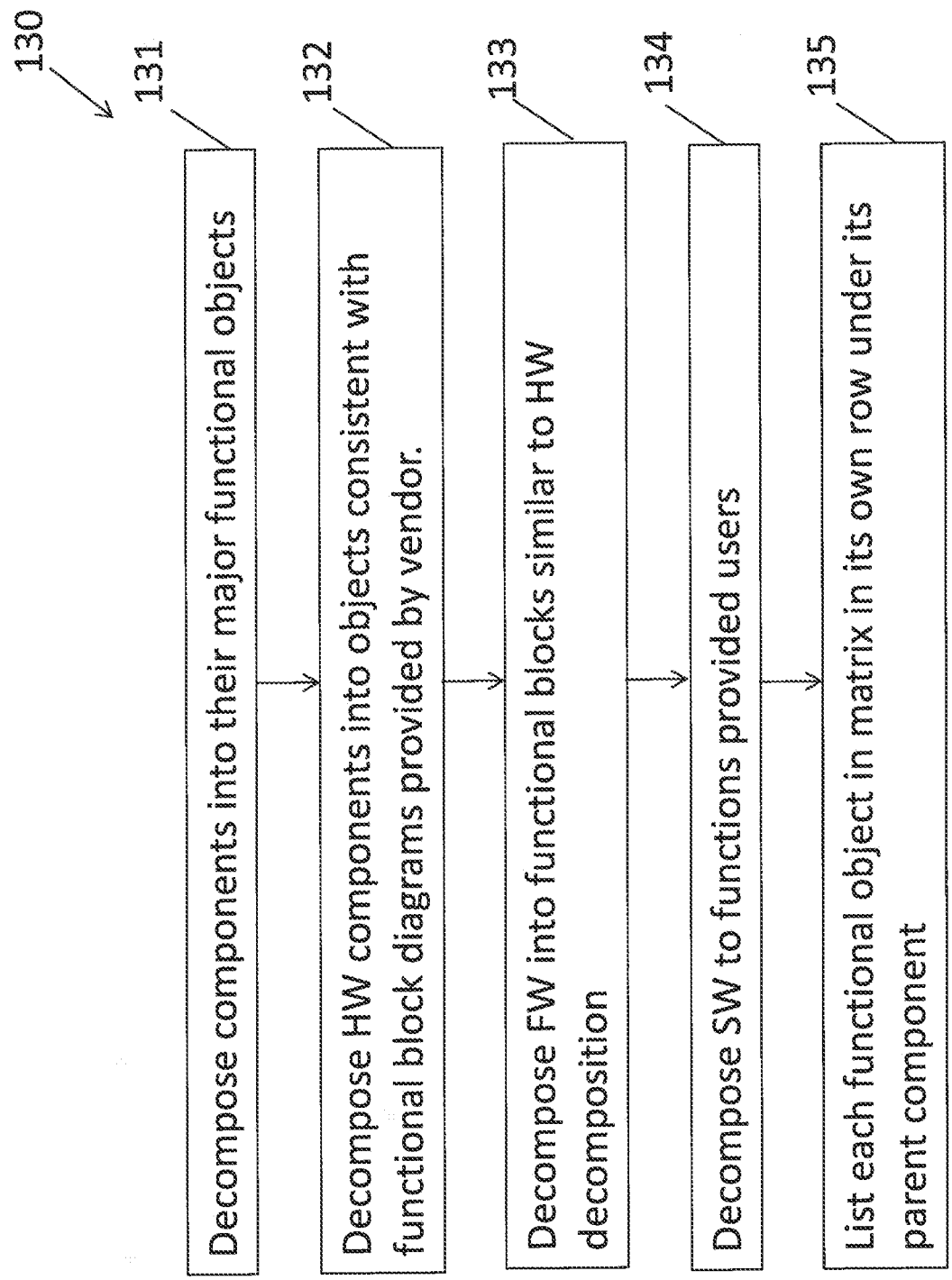
FIG. 11 is a more detailed flow chart of one of the steps in FIG. 8.

Referring now also to FIG. 11, in Decompose Components to Preliminary Design Functional Level step 130, components are decomposed into objects. In step 131, components are decomposed into their major functional objects, for example, map major functional behaviors to their implementing hardware or software. This provides a starting point for analyzing the target system. One only needs sufficient granularity in this step to start a system model. In step 132, hardware components are decomposed into objects consistent with functional block diagrams provided by a vendor. Processors will be decomposed into many functional objects, whereas there is little need to decompose memory chips. In step 133, firmware is decomposed into functional blocks similar to hardware decomposition. In step 134, decompose software to functions provided users and in step 135, list each functional object in the matrix in its own row under its parent component.

When decomposing components, for structural elements, use abstract terms such as gates, code, static data, and/or static registers rather than specific named objects. For state elements, again, list abstract constructs such as stack, variables, and/or heap. For functional behaviors (functions), list the functions provided by each functional object, for example, write protect, data transport, or encryption. For implementation behaviors, list behaviors specific to the object's implementation that can be detected, for example, memory faults, exceptions, bus faults, or execution sequence. Again, the initial decomposition provides a starting point for analyzing the target system and one only needs sufficient granularity to start the model. As described above, in Import Trust and Trustworthiness Scores step 140 the trust score and the trustworthiness score for the object is captured and stored. It should be noted, at this point, we have a two-dimensional matrix (spreadsheet) with each column representing an action and each row representing an object as shown in FIG. 3.

Figure 12:
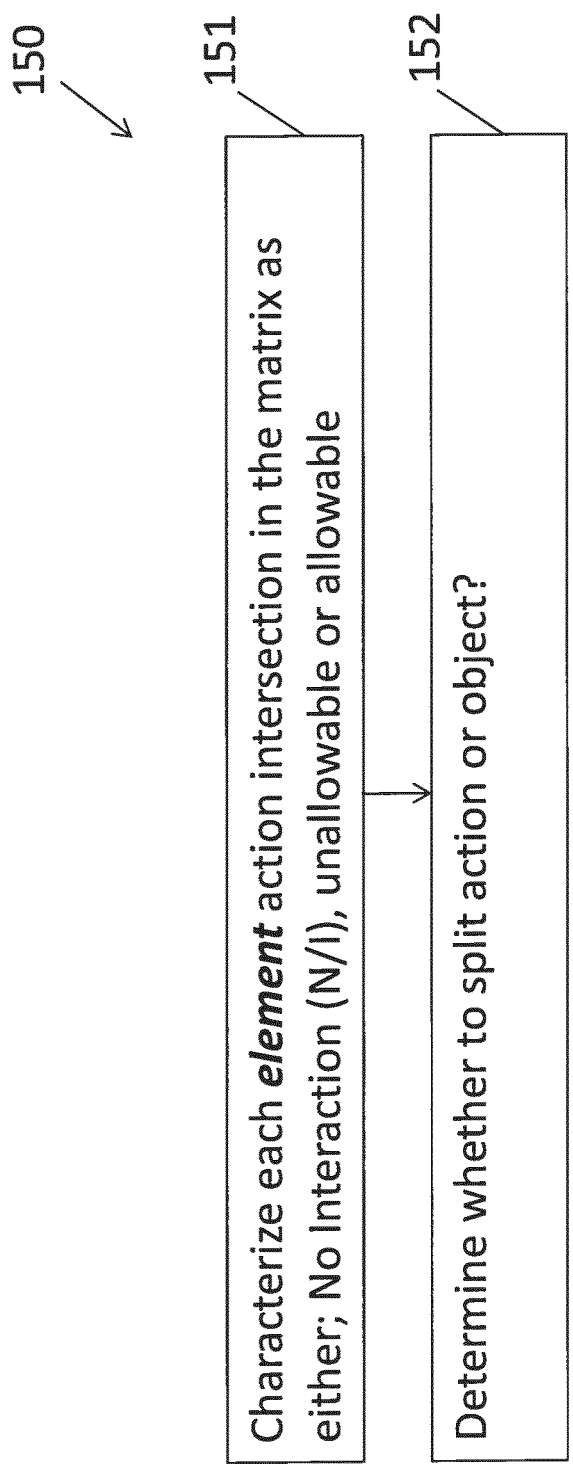
FIG. 12 is a more detailed flow chart of one of the steps in FIG. 8.

Referring now also to FIG. 12, in Assess Interactions step 150, each interaction is captured. In step 151, each element action intersection in the matrix is characterized as either: no interaction (N/I) if an action cannot access an object (meaning that there is no way for the action to manipulate the object, not that a PCM prevents the interaction); essential if it can't be prevented without preventing system from working as designed, or nonessential otherwise. When categorizing interactions, assess whether the action originator changes interaction categorization, action affects different facets of an object differently and, if so, consider splitting either the action or the object to simplify categorization as shown is step 152.

Figure 13:
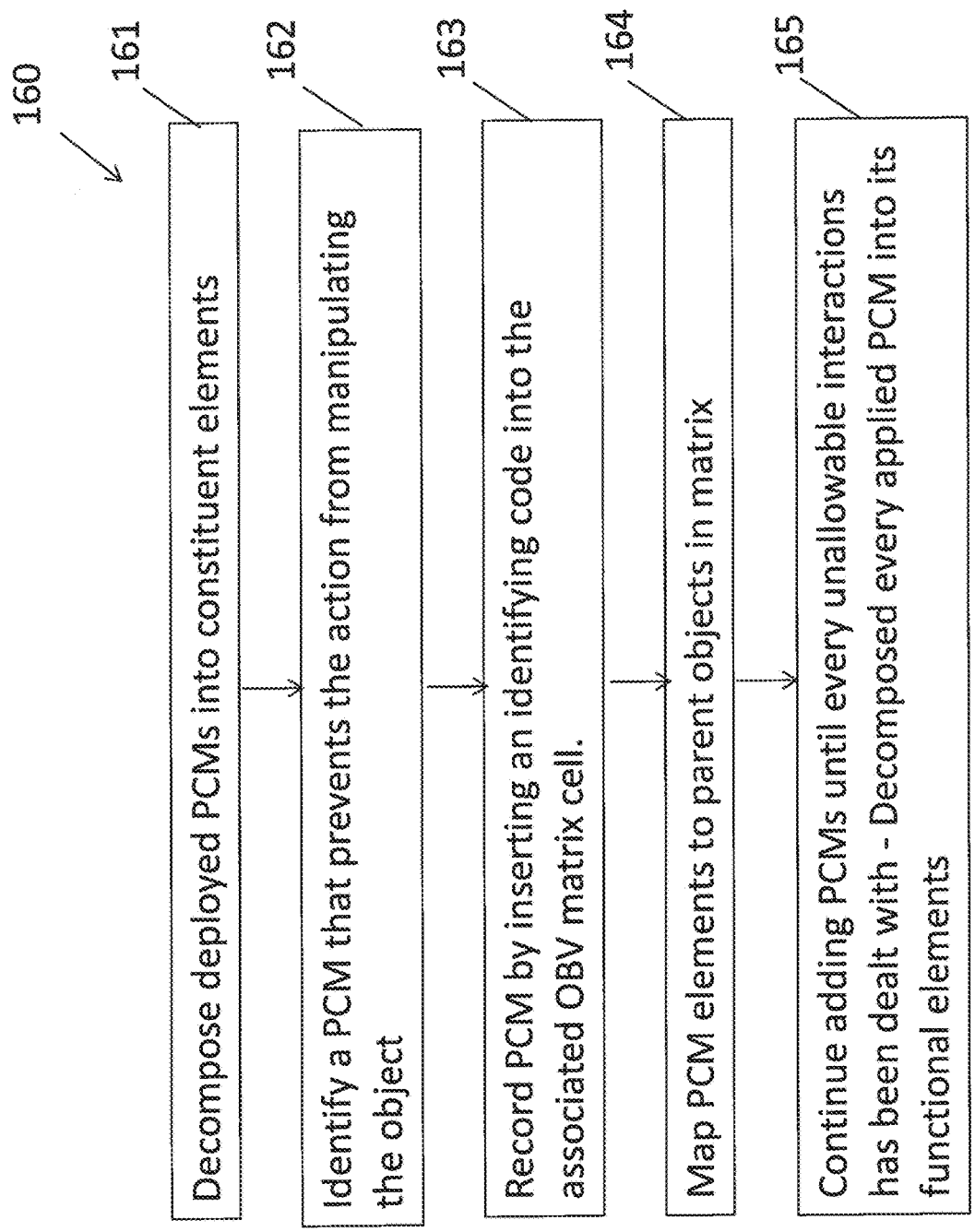
FIG. 13 is a more detailed flow chart of one of the steps in FIG. 8.

Referring now also to FIG. 13, in Apply PCMs step 160, preventive countermeasures (PCMs) are applied to prevent nonessential interactions. For each nonessential interaction in the matrix, a PCM should be identified that prevents the action from manipulating the object. Use existing, already deployed PCMs where possible. If none exists, devise a new PCM or leave blank if a new PCM is not readily available. PCMs are recorded by inserting an identifying code into the associated OBV matrix cell. In more detail, in step 161, deployed PCMs are decomposed into constituent elements. For example, write protection decomposes to a MMU circuit, TLB registers, the TLB hash tables maintained by the OS, and the OS. In step 162, identify a PCM that prevents the action from manipulating the object. In step 163, record the PCM by inserting an identifying code into the associated OBV matrix cell. In step 164, map PCM elements to parent objects in matrix, if the element is not already in the matrix, add it on its own row; categorize action interactions with new elements as before. In step 165, continue adding PCMs until you have dealt with every nonessential interaction and decomposed every applied PCM into its functional objects.

Figure 14:
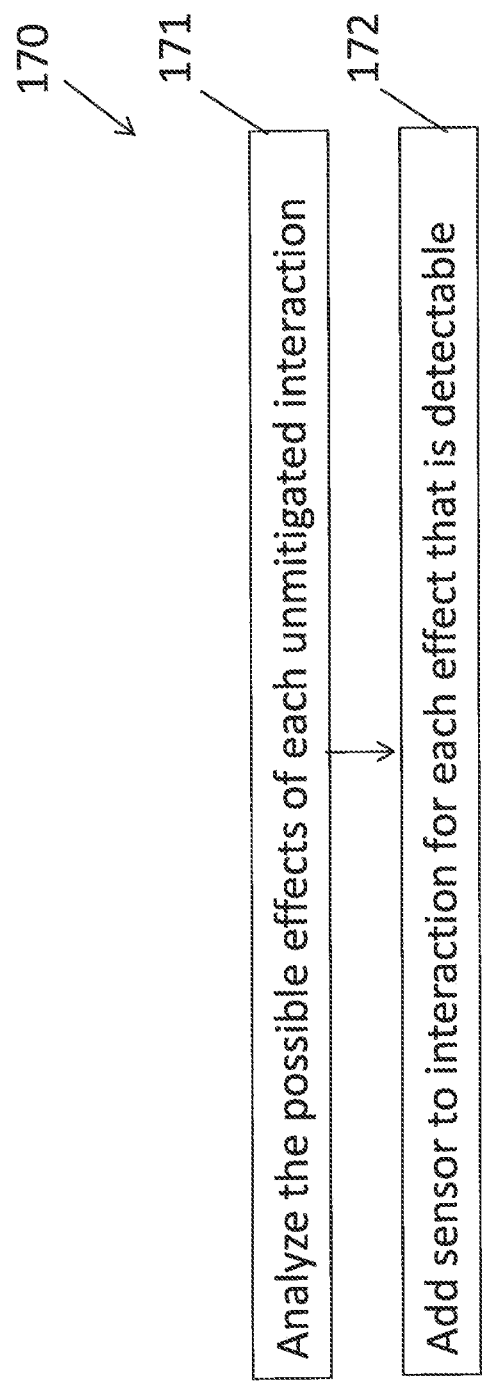
FIG. 14 is a more detailed flow chart of one of the steps in FIG. 8.

Referring now also to FIG. 14, Apply RCMs to detect and react to undesired effects step 170 is performed where RCMs are added to the effects to detect such effects and take action as appropriate. In step 171, for each unmitigated interaction, analyze the possible effects of that interaction to include: element corruption where the element changed as a result of interaction (e.g. write to code); delta functional behavior where the element was changed, causing the object's intended behavior to change; or delta implementation behavior where the element was changed, causing other behaviors to change which can be detected. In step 172, for each effect that can be detected, add a sensor to detect the interaction. Reactive countermeasures are sensors that cause a reaction when an effect is detected. In OBV, assume that appropriate reactions are employed.

Having described various features of the disclosure, it should now be appreciated that the set of actions operating on system functional objects effectively defines the attack language alphabet and each of these action-object interactions need to be examined in detail in order to further characterize the alphabet. To cause a desired functional behavior, an attack action will interact with the object's structure, state or input. The significance of the interactions is evaluated using the following characterizations:

Interaction Is Not Possible (e.g. No Interaction)—The system design does not allow this interaction to occur under any circumstances.

Interaction Is Possible But Is Not Essential—The interaction is not necessary for proper system operation.

Interaction Is Possible And Is Essential—The interaction is necessary for proper system operation.

Interaction Is Essential But Will Not Impact System Integrity—This interaction cannot alter the system functional behavior.

Interaction Is Essential And Can Impact System Integrity—This interaction can potentially alter the system functional behavior.

Next the countermeasures against an attacker exploiting Nonessential Interactions and the Essential Interactions with System Integrity Impacts are factored in. These fall into the following categories:

Preventative Countermeasure Implemented—A countermeasure is in place that prevents this interaction from occurring.

Sensor Implemented—A sensor is in place that detects the interaction. The sensor will necessarily be coupled with a reaction to form a Reactive Countermeasure but it is the sensing of the interaction that is relevant at this stage of the process.

Residual Vulnerability—Possible interactions that have a potential system integrity impact and are neither prevented nor detected. These interactions could potentially be used as part of a successful attack on the system and are classified as Residual Vulnerabilities of the information system.

Figure 15:
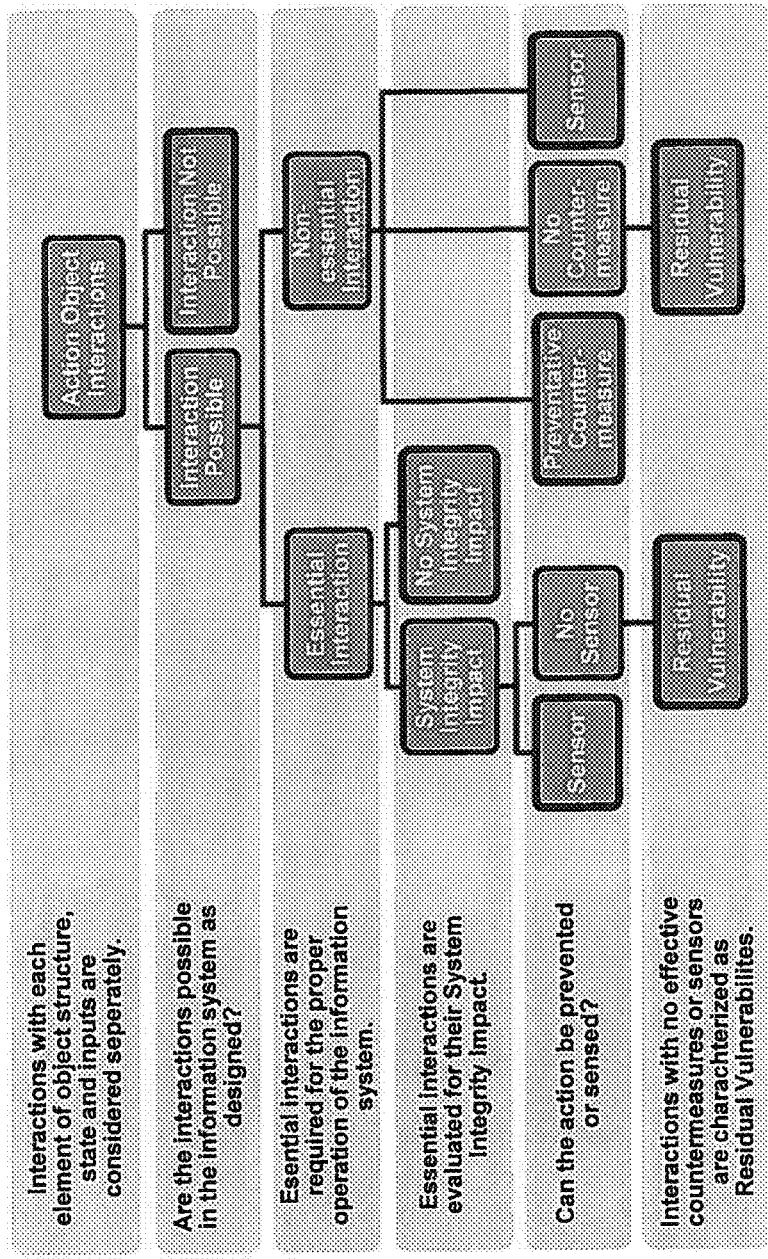
FIG. 15 is a decision tree illustration of the process for determining potential interactions for various objects.

This process is illustrated in FIG. 15 using the contemplated decision tree. Interactions with each object's structure, state, and input model elements are considered separately. The No System Integrity Impact characterization could have also been applied to Nonessential Interactions. Instead, a policy that Nonessential Interactions require either prevention or detection regardless of their impact on system integrity is followed. The characterization process results in each action-object interaction being placed in one of the following categories: Interaction Not Possible, No System Integrity Impact, Preventative Countermeasure Implemented. Sensor Implemented, or Residual Vulnerability. In characterizing the attack alphabet as described above, it may be discovered that adjustments in the granularity of the functional object decomposition, the attack action decomposition, or the functional object models are required. If an interaction cannot be characterized without qualification, e.g., the interaction is "not possible" only in certain situations or Preventative Countermeasures are only effective some of the time, then more granularity in the decomposition or modeling is required to resolve the ambiguity. If, on the other hand, repeating patterns of interactions emerge it may be desirable to aggregate functional objects or actions in the interest of clarity and reduced tediousness. As the attack alphabet characterization progresses the decomposition and modeling converges to the appropriate level of granularity. The required modeling fidelity is achieved by resolving all of the characterization ambiguities.

Referring now to an example of a software object's OBV in FIG. 16, the light area in the left column represents a Gateway software object's structure, state and inputs. Since the Gateway is a software object it follows the software model pattern. Structure consists of the Gateway code base and static data. State consists of critical data structures—specifically message routing and access data (policy descriptors), global variables, stack frame, stack variables, and heap. Inputs are messages, interrupts, exceptions, and signals.

The top row represents all of the actions a cyber-attacker could possibly take to alter the Gateway behavior given the threat definition and the security system design. As previously mentioned, our approach to insuring a complete enumeration of attack actions is to decompose the set of all possible cyber attacker actions into relatively complimentary sets. For the first level of decomposition we refer to the system's threat definition. The threat definition specifies that the cyber attacker can act when the system is either Operational or Nonoperational or both. The information system is Operational when it's performing its intended purpose, i.e., ingesting, processing and producing critical and sensitive data that require confidentiality, integrity and availability assurance. The system is Nonoperational at all other times.

During nonoperation a properly positioned cyber attacker could potentially insert malware into the system. Since different stages of the system's development and logistics chain offer the attacker different levels of access and control, the nonoperational malware insertion attack action is further decomposed according to the stage of the development/logistics chain. The first level of decomposition differentiates between pre-delivery and post-delivery. Pre-delivery is further decomposed into design and production stages. This decomposition leads to the following enumeration of malware insertion attack actions.

Design stage malware insertion—The cyber attacker is assumed to have control over the system design, i.e., the source code for software and firmware or the schematic and bill of materials for the hardware. A malware insertion at this stage will affect every system built to the affected design baseline.

Production stage malware insertion—The cyber attacker is assumed to have control over production hardware processes and materials and the Operational Flight Program executable image. A malware insertion at this stage can affect one or more systems.

Post Delivery (Logistics/maintenance) stage malware insertion—The system is in the hands of the end user or their agents and is either in transport, in storage, being maintained or being actively used in a nonoperational scenario (e.g., a training mission that does not involve critical or sensitive data). The cyber attacker is assumed to have physical access and control over the system or its components and control over the Operational Flight Program executable image. A malware insertion at this stage can affect one or more systems.

This decomposition of nonoperational attack actions is an example of where the extra decompositional granularity (OBVM fidelity) is required to unambiguously represent PCMs that are applicable to the different stages of the system development and logistics. When the system is Operational, it is assumed to be installed in its target platform and protected from physical attack during operation by its installation, operating environment, and AT provisions. But, even without a physical presence, the cyber attacker could still act on system objects during operation by exerting control over physical devices that make up the system or are connected to the system. The system is a conventional multiprocessor computing system consisting of various memories, programmable microprocessor cores, peripheral devices, and functional devices connected together and to devices outside of the system by data buses, data interfaces and discrete signal interfaces. The cores and other devices interact with memory and other system objects through these interfaces. The attack actions available to a cyber attacker controlling a given device are limited to the interface actions enabled by the device. Data buses and data interfaces can be read and written and discrete signal interfaces can be asserted. For programmable microprocessor core devices, reads can be either data reads or instruction fetches. These observations lead to the following attack action decomposition. Operational attack actions are first decomposed into those originating from external devices or internal devices. Here the distinction between internal and external devices is relative to the complex containing the target object. This is important because in the case of system microprocessor complexes, internal devices have direct access to the internal microprocessor connection fabrics and external devices connect through chip level interfaces: SRIO, PCIe, Ethernet, etc., leading to different countermeasure applicability. For example, for the system COTS microprocessor complex on-chip peripherals are internal devices. External devices are off-chip interface devices that can be either inside or outside the system.

Internal devices are further decomposed into core and non-core devices. Core devices operate under the control of an executing program. The system spatial isolation system assigns each program a context that limits the program's access privileges. Core devices inherit the context of the executing program which restricts their interface actions. This is represented by decomposing core device actions into either In Scope or Out ofScope. This decomposition leads to the operational attack actions shown in the example OBVM figure: external device actions, in scope core actions, out of scope core actions, and internal noncore device actions. A complete list of all devices in each category could have been exhaustively enumerated. This would not be improper but would simply lead to a pattern where devices would have "possible" interactions for objects they can affect and be shown as "Interaction Not Possible" for objects they can't affect. The extra detail is unnecessary to meet the OBVM fidelity requirement and is not shown.

The example OBVM figure of FIG. 16 shows the Gateway object interactions sorted into one of the five previously defined categories as indicated by the color code. The interactions that would have otherwise been classified as RVs are shown treated with PCMs and sensors (blue and green color codes). The number in the cells references the actual PCMs and sensors used.

Below the interaction matrix the functional and implementation anomalous behaviors identified for the Gateway object are listed. The codes referencing the actual sensors associated with the behaviors are shown to the far right. This indicates a nonspecific association of the behaviors with the Gateway object. If it were possible to associate the behaviors with specific actions, they would have been identified with the appropriate action.

Referring now to FIG. 17, a computer 300 includes a processor 302, a volatile memory 304, a non-volatile memory 306 (e.g., hard disk) and the user interface (UI) 308 (e.g., a graphical user interface, a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the processes described herein.

The processes and methods described herein are not limited to use with the hardware and software of FIG. 17; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 100 in FIG. 8 is not limited to the specific processing order of FIG. 8. Rather, any of the processing blocks of FIG. 8 may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

The resulting OBV Model provides an objective assessment of a system's residual vulnerabilities after countermeasures have been applied. As such, the OBV Methodology can be performed on multiple architectures, including different COTS processors and operating systems. Processor architectures will likely have some common set of actions and some architecture-unique set of actions. Each system will have a unique set of objects that lead to a system-specific suite of PCMs/sensors. Comparing the resulting OBVM matrices for different architectures, the residual vulnerabilities of those architectures can be assessed for their security risk.

The OBV Methodology can also be applied to existing systems based on the currently fielded hardware and software configuration. Applying a design-centric vulnerability assessment yields the set of residual vulnerabilities where nonessential interactions have not been mitigated. The resulting matrix can then be used to drive upgrades and/or architecture improvements.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A method for implementing an object based vulnerability model comprising the steps of:
  identifying each component in an information system and annotating such component in a database;
  decomposing each component into major functional objects and annotating each object in a database;
  identifying actions an attacker could take to modify a behavior of the functional objects in the information system and annotating such actions in a database;
  capturing a trust score and a trustworthiness score for each object and annotating the trust score and the trustworthiness score in the database;
  assessing each action on the structure, state, and inputs of each functional object to determine if an interaction exists and annotating the interaction existence in the database;
  applying preventive countermeasures to those interactions posing a risk; and
  applying reactive countermeasures to those interactions posing a risk not protected by preventative countermeasures.

2. The method as recited in claim 1 wherein the step of identifying every component in the information system and annotating such component in a database comprises:
  identifying active hardware devices listed in a bill of materials;
  identifying firmware; and
  identifying system software.

3. The method as recited in claim 1 wherein the step of decomposing each component into major functional objects and annotating each object in a database comprises:
  decomposing components into major functional objects;
  decomposing hardware components into objects consistent with hardware component design information provided by the vendor;
  decomposing firmware into functional blocks similar to hardware composition;
  decomposing software to functional objects; and
  listing each functional object in a matrix in its own row under a parent component.

4. The method as recited in claim 1 wherein the step of identifying actions associated with each object in an information system and annotating such action in a database comprises:
  populating an object based vulnerability matrix with actions as provided in a system architecture; and
  comparing identified actions against system design to determine if a target system supports additional operations.

5. The method as recited in claim 1 wherein the step of assessing each interaction to determine if an interaction exists with that object and annotating the interaction existence in the database comprises:
  characterizing each object action intersection as either no interaction, essential or nonessential; and
  determining if an object or an action needs to be split to allow its categorization.

6. The method as recited in claim 1 wherein the step of applying preventive countermeasures to those interactions posing a risk comprises:
- identifying a preventive countermeasure that prevents the action from manipulating the object;
- recording the applicable preventive countermeasure as identified into a matrix;
- mapping the preventive countermeasures to a parent object in the matrix;
- decomposing deployed preventive countermeasures into constituent elements;
- continuing to add preventive countermeasures until every nonessential interaction has been reviewed.

7. The method as recited in claim 1 wherein the step of applying reactive countermeasures to those interactions posing a risk not protected by preventive countermeasures comprises:
- analyzing possible effects of each unmitigated interaction; and
- adding a sensor to each interaction where the interaction is detectable.

8. A non-transitory machine-readable medium including instructions for implementing an object based vulnerability model comprising the steps of:
- identifying each component in the information system and annotating such component in a database;
- decomposing each component into major functional objects and annotating each object in a database;
- identifying actions an attacker could take to modify the behavior of the functional objects comprising an information system and annotating such action in a database;
- capturing a trust score and a trustworthiness score for each object and annotating the trust score and the trustworthiness score in the database;
- assessing each action on structure, state, and inputs of each functional object to determine if an interaction exists and annotating the interaction existence in the database;
- applying preventive countermeasures to those interactions posing a risk; and
- applying reactive countermeasures to those interactions posing a risk not protected by preventive countermeasures.

* * * * *